「(12) United States Patent
Kubota

(10) Patent No.: US 7,489,682 B2
(45) Date of Patent: Feb. 10, 2009

(54) PACKET RELAY SYSTEM

(75) Inventor: Makoto Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 499 days.

(21) Appl. No.: 11/407,234

(22) Filed: Apr. 20, 2006

(65) Prior Publication Data
US 2007/0140273 A1 Jun. 21, 2007

(30) Foreign Application Priority Data
Dec. 19, 2005 (JP) ............... 2005-364658

(51) Int. Cl.
H04L 12/28 (2006.01)
(52) U.S. Cl. .................. 370/389
(58) Field of Classification Search .......... 370/398, 370/422, 389, 392, 395.3, 395.31, 471, 474; 709/232, 243, 244; 726/12, 13
See application file for complete search history.

(56) References Cited
U.S. PATENT DOCUMENTS
7,362,763 B2 * 4/2008 Wybenga et al. ......... 370/395.1

2004/0162992 A1 * 8/2004 Sami et al. ............... 713/200

FOREIGN PATENT DOCUMENTS
JP 06-097965 A 4/1994
JP 2004-201164 A 7/2004

* cited by examiner

Primary Examiner—Chirag G Shah
Assistant Examiner—Otis L Thompson, Jr.
(74) Attorney, Agent, or Firm—Staas & Halsey LLP

(57) ABSTRACT

A packet relay system requests a peripheral apparatus to perform filtering and enhances the quality of packet relaying. A path establishment block establishes a request path on which a packet to be proxy-filtered is sent and a return path on which a proxy-filtered packet is received. A request source filter status determination block determines whether the packet requires a request to perform proxy filtering, does not require the request, or has already been proxy-filtered. A filtering request block generates a filtering request packet by inserting a request path identifier into the packet. A proxy filter status determination block determines whether the packet requires proxy filtering or not when the filtering request packet is received. A proxy filtering block searches through a proxy filter table by the request path identifier. A filtering return block generates a proxy filtering packet by inserting a return path identifier, when the packet can be relayed.

10 Claims, 23 Drawing Sheets

T0-1 FILTER TABLE

| RECEPTION PORT | RECEPTION VLAN ID | TRANSMISSION SOURCE MAC | FILTERING RESULT |
|---|---|---|---|
| P1a-1 | 1 | TERMINAL t1 | permit |
| P1a-1 | 1 | TERMINAL t2 | permit |
| P1a-1 | 1 | TERMINAL t3 | permit |
| P1a-1 | 1 | * | deny |
| P1a-2 | 1 | TERMINAL t4 | permit |
| P1a-2 | 1 | TERMINAL t5 | permit |
| P1a-2 | 1 | TERMINAL t6 | permit |
| P1a-2 | 1 | * | deny |
| P1b-1 | * | TERMINAL t7 | permit |
| P1b-1 | * | TERMINAL t8 | permit |
| P1b-1 | * | * | deny |

⎫ FILTER DEFINITIONS INCLUDED IN NODE R1

| P1b-2 | * | TERMINAL t9 | permit |
| P1b-2 | * | * | deny |

⎫ OVERFLOW FROM NODE R1

\* : don't care

FIG. 4

T1-1 PORT VLAN TABLE

| RECEPTION PORT | RECEPTION VLAN ID |
|---|---|
| P1a-1 | 1 |
| P1a-2 | 1 |
| P1b-1 | 2 |
| P1b-2 | 2 |

T2-1 VLAN MEMBER TABLE

| RECEPTION VLAN ID | MEMBER PORTS |
|---|---|
| 1 | P1a-1, P1a-2 |
| 2 | P1b-1, P1b-2 |
| VLAN-p1 | P1c |
| VLAN-q1 | P1c |

T3-1 ROUTING TABLE

| DESTINATION IP | NEXT HOP IP | DESTINATION PORT | TRANSMISSION VLAN-ID |
|---|---|---|---|
| SERVER 21 | R3 | P1d | 3 |
| SERVER 22 | R2 | P1c | 5 |

T4-1 ARP TABLE

| IP | MAC |
|---|---|
| R3 | MAC-3 |
| R2 | MAC-2 |

T5-1 LEARNING TABLE

| RECEPTION VLAN ID | DESTINATION MAC | DESTINATION PORT |
|---|---|---|
| 1 | TERMINAL t4 | P1a-2 |

FIG. 5

T6-1 FILTER STATUS DETERMINATION TABLE

| RECEPTION PORT | RECEPTION VLAN ID | FILTER STATUS | REQUEST DESTINATION NODE AND RETURN DESTINATION NODE INFORMATION | | HEADER OPERATION INFORMATION |
|---|---|---|---|---|---|
| | | | DESTINATION PORT | TRANSMISSION VLAN ID | |
| * | VLAN-q1 | PROXY-FILTERED | – | – | TAG DELETION |
| P1a-1 | * | REQUEST NOT REQUIRED | – | – | – |
| P1a-2 | * | REQUEST NOT REQUIRED | – | – | – |
| P1b-2 | * | REQUEST REQUIRED | P1c | VLAN-p1 | TAG ADDITION |
| P1b-1 | * | REQUEST NOT REQUIRED | – | – | – |

T7-1 FILTER TABLE

| RECEPTION PORT | RECEPTION VLAN ID | REQUEST VLAN | TRANSMISSION SOURCE MAC | FILTERING RESULT |
|---|---|---|---|---|
| P1a-1 | 1 | * | TERMINAL t1 | permit |
| P1a-1 | 1 | * | TERMINAL t2 | permit |
| P1a-1 | 1 | * | TERMINAL t3 | permit |
| P1a-1 | 1 | * | * | deny |
| P1a-2 | 1 | * | TERMINAL t4 | permit |
| P1a-2 | 1 | * | TERMINAL t5 | permit |
| P1a-2 | 1 | * | TERMINAL t6 | permit |
| P1a-2 | 1 | * | * | deny |
| P1b-1 | 2 | * | TERMINAL t7 | permit |
| P1b-1 | 2 | * | TERMINAL t8 | permit |
| P1b-1 | 2 | * | * | deny |

T8-1 PORT DECODE TABLE

| RETURN VLAN ID | RECEPTION PORT |
|---|---|
| VLAN-q1 | P1b-2 |

T1-2  PORT VLAN TABLE

| RECEPTION PORT | RECEPTION VLAN ID |
|---|---|
| P2a | 5 |
| P2d | 6 |

T2-2  VLAN MEMBER TABLE

| RECEPTION VLAN ID | MEMBER PORTS |
|---|---|
| 5 | P2a |
| 6 | P2d |
| VLAN-p1 | P2c |
| VLAN-q1 | P2c |

T3-2  ROUTING TABLE

| DESTINATION IP | NEXT HOP IP | DESTINATION PORT | TRANSMISSION VLAN-ID |
|---|---|---|---|
| SERVER 1 | R1 | P2c | 7 |
| SERVER 2 | R5 | P2d | 8 |

T4-2  ARP TABLE

| IP | MAC |
|---|---|
| R1 | MAC-1 |
| R5 | MAC-5 |

T5-2  LEARNING TABLE

| RECEPTION VLAN ID | DESTINATION MAC | DESTINATION PORT |
|---|---|---|
|  |  |  |
|  |  |  |

FIG. 8

T6-2 FILTER STATUS DETERMINATION TABLE

| RECEPTION PORT | RECEPTION VLAN ID | FILTER STATUS | REQUEST DESTINATION AND RETURN DESTINATION NODE INFORMATION | | HEADER OPERATION INFORMATION |
|---|---|---|---|---|---|
| | | | DESTINATION PORT | TRANSMISSION VLAN ID | TAG REPLACEMENT |
| * | VLAN-p1 | REQUEST REQUIRED | P2c | VLAN-q1 | — |
| * | 5 | REQUEST NOT REQUIRED | — | — | — |
| * | 6 | REQUEST NOT REQUIRED | | | |

FIG. 9

T9-1 MULTICAST ROUTING TABLE

| DESTINATION IP | DESTINATION PORT | RELAY LAYER | TRANSMISSION VLAN ID |
|---|---|---|---|
| 235.1.2.3 | P1c | LAYER 3 | 4 |
| | P1d | LAYER 3 | 3 |
| | P1b-1 | LAYER 2 | SAME AS IN RECEPTION |
| | P1b-2 | LAYER 2 | SAME AS IN RECEPTION |

T6a-1 FILTER STATUS DETERMINATION TABLE

| RECEPTION PORT | TRANSMISSION PORT | RECEPTION VLAN ID | FILTER STATUS | REQUEST DESTINATION AND RETURN DESTINATION NODE INFORMATION | | HEADER OPERATION |
|---|---|---|---|---|---|---|
| | | | | DESTINATION PORT | TRANSMISSION VLAN ID | |
| * | * | VLAN-q1 | PROXY-FILTERED | P1d | 3 | TAG DELETION, LAYER 3 |
| P1b-2 | P1d | * | REQUEST REQUIRED | P1c | VLAN-p1 | TAG ADDITION |
| other | | | REQUEST NOT REQUIRED | — | — | — |

T7a-1 FILTER TABLE

| RECEPTION PORT | RECEPTION VLAN ID | REQUEST VLAN | TRANSMISSION SOURCE MAC | FILTERING RESULT |
|---|---|---|---|---|
| P1a-1 | P1d | * | TERMINAL t1 | permit |
| P1a-1 | P1d | * | TERMINAL t2 | permit |
| P1a-1 | P1d | * | TERMINAL t3 | permit |
| P1a-1 | * | * | * | deny |
| P1a-2 | P1d | * | TERMINAL t4 | permit |
| P1a-2 | P1d | * | TERMINAL t5 | permit |
| P1a-2 | P1d | * | TERMINAL t6 | permit |
| P1a-2 | * | * | * | deny |
| P1b-1 | P1d | * | TERMINAL t7 | permit |
| P1b-1 | P1d | * | TERMINAL t8 | permit |
| P1b-1 | * | * | * | deny |

PACKET RELAY SYSTEM

CROSS-REFERENCE TO RELATED APPLICATIONS

This application is based upon and claims the benefits of priority from the prior Japanese Patent Application No. 2005-364658, filed on Dec. 19, 2005, the entire contents of which are incorporated herein by reference.

BACKGROUND OF THE INVENTION

1. Field of the Invention

The present invention relates to packet relay systems, and particularly to a packet relay system which filters packets and relays packet communication.

2. Description of the Related Art

In recent years, the widespread use of broadband networks and the advance of wireless technologies make it possible to use video, audio, and many other applications, increasing the importance of network operations. This, however, poses constant risk of attacks such as unauthorized access to information communications networks. Higher network security is required.

One general feature for protecting a network from unauthorized access is filtering. The filter function checks packets sent on a network for whether they can be passed and ensures security by discarding any unauthorized packet. Filtering prevents an unnecessary packet from being relayed, and traffic can be reduced.

If filtering is specified in a packet relay apparatus such as a router, packets are filtered by using information of layer 2 to layer 4. The filtering can be protocol filtering for passing just hypertext transfer protocol (HTTP) packets, for instance, or filtering by packet reception port or transmitting terminal address.

The packet relay apparatus generally has a filter table of a fixed capacity. Filtering is performed by comparing the parameter information of a filter rule specified in the filter table and packet header information.

FIG. 22 is a view showing a router having a filter table. The figure shows an example of simple filtering. A router 100 has a filter table 110. The filter table 110 lists reception ports, transmission-source media access control (MAC) addresses, and filtering results.

When port P11 of the router 100 receives a packet sent from a terminal 5, the packet is relayed and sent to a specified address because the corresponding filtering result is "permit" in the filter table 110. If port P12 receives a packet, the router 100 discards the packet because the corresponding filtering result is "deny" in the router 100.

One conventional packet filtering technology uses a plurality of network interfaces in a router to perform filtering and routing separately (refer to Unexamined Japanese Patent Application Publication No. Hei-6-97965, paragraph numbers 0008 to 0012 and FIG. 1, for instance).

A router provided on a network performs filtering in accordance with a filter table like the filter table 110 described above. As the network has become huge and complicated in recent years, an increased number of filter rules and entries has been required, increasing the possibility that the capacity of the table in the apparatus becomes insufficient.

The shortage of table capacity can be made up simply by adding memory. The addition, however, increases the equipment cost. Alternatively, a filter may be specified in a different router that has an available space in the table resource, and packets are transferred to the different router, thereby performing proxy filtering.

FIG. 23 shows packet relaying through proxy filtering by another router. If the router 100 cannot perform filtering when the router 100 relays a packet to a terminal 6, the router 100 asks a router 101 on a packet transfer route to perform filtering. If the router 101 determines that the packet can be passed, as a result of filtering, the router 101 sends the packet to the final destination, which is the terminal 6.

With this method, the router 101, which is asked to perform filtering, must be on the route to the final destination, which is the terminal 6. Whether filtering can be asked depends on the transfer route of the network topology. For instance, if the router 101 in the vicinity of the request source router 100 is not in contact with the terminal 6 on the network, the router 101 cannot be asked to perform filtering.

If it is determined that a packet can be passed, as a result of filtering performed by the router 101, the packet may be looped back to the request source router 100, thereby sent to the final destination, which is the terminal 6.

In the conventional packet relay network, the router 101 cannot perform proxy filtering based on the information specific to the request source router 100. Packet filtering requires information specific to the apparatus on which a filter is specified, such as a packet reception or transmission port number, as a filter key. Because layer 2 or layer 3 does not have a function to transfer the apparatus-specific information to a different router, the conventional packet relay system cannot perform filtering based on the information specific to the request source node.

Another problem of the conventional packet relay network is that a packet cannot be looped back from the proxy filtering router 101 to the request source router 100. When the request to perform filtering is made to a different router, the received packet must be transferred to the router 101 without rewriting the header of the packet. Layer 2 or layer 3 does not have a function to transfer the packet to a router beyond the route of the packet.

Even if the packet can be transferred and a filtering request can be made, the router 101 performs layer-2 relaying and loopback transmission to the reception port because MAC-DA of the received packet is not a local address.

In layer-2 relaying flow, a dynamic filtering function provided to avoid a packet loop usually discards a packet of which reception port matches its transmission port. The dynamic filtering function of the router 100 prevents the packet from being looped back to the request source router 100.

With the conventional technology described above (Unexamined Japanese Patent Application Publication No. Hei-6-97965), filtering is performed in accordance with the filter table in the router. No provisions have been made for the router when it cannot perform filtering because of an insufficient capacity of the table.

SUMMARY OF THE INVENTION

In view of the foregoing, it is an object of the present invention to provide a packet relay system which enables filtering at a remote node when filtering at the local node is impossible and transfers packets to the remote node to improve communication quality in packet relaying.

To accomplish the above object, according to the present invention, there is provided a packet relay system which relays packet communication. This packet relay system includes a request source packet relay apparatus and a proxy packet relay apparatus. The request source packet relay apparatus includes the following elements: a path establishment block which establishes a request path on which a received packet to be proxy-filtered is sent to a proxy apparatus requested to perform proxy filtering of the packet and a return path on which the packet proxy-filtered by the proxy apparatus is received; a request source filter status determination block which determines whether the received packet requires a request that another apparatus performs proxy filtering, does not require the request, or has already been proxy-filtered and, when the packet requires the request, obtains a request destination port used to send the packet to the proxy apparatus and a request path identifier; a filtering request block which inserts the request path identifier into the packet to generate a filtering request packet; a request source transmission block which sends the filtering request packet from the request destination port to the proxy apparatus; and a packet update block which receives a proxy filtering packet, and when the request source filter status determination block determines that the proxy filtering packet has already been proxy-filtered, deletes a return path identifier from the packet, updates header information, and relays the packet. The proxy packet relay apparatus includes the following elements: a proxy filter status determination block which receives the filtering request packet, which includes the request path identifier, determines whether the packet requires proxy filtering or not, and, when proxy filtering is required, obtains a proxy destination port used to send the packet to the request source packet relay apparatus and the return path identifier; a proxy filter table which specifies the conditions of filtering of the received packet; a proxy filtering block which determines whether the filtering request packet can be relayed or should be discarded by searching through the proxy filter table using the request path identifier as a key, when proxy filtering is performed; a filtering return block which generates the proxy filtering packet by deleting the request path identifier from the filtering request packet and inserting the return path identifier, when the packet can be relayed; and a proxy transmission block which performs loopback transmission of the proxy filtering packet from the proxy destination port to the request source packet relay apparatus.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a view showing a filter table.
FIG. 5 shows tables.
FIG. 6 shows another table.
FIG. 7 shows further tables.
FIG. 8 shows other tables.
FIG. 9 shows a further table.
FIG. 18 is a view showing a multicast routing table.
FIG. 19 shows a filter status determination table and a filter table.

DESCRIPTION OF THE PREFERRED EMBODIMENTS

Figure 1:
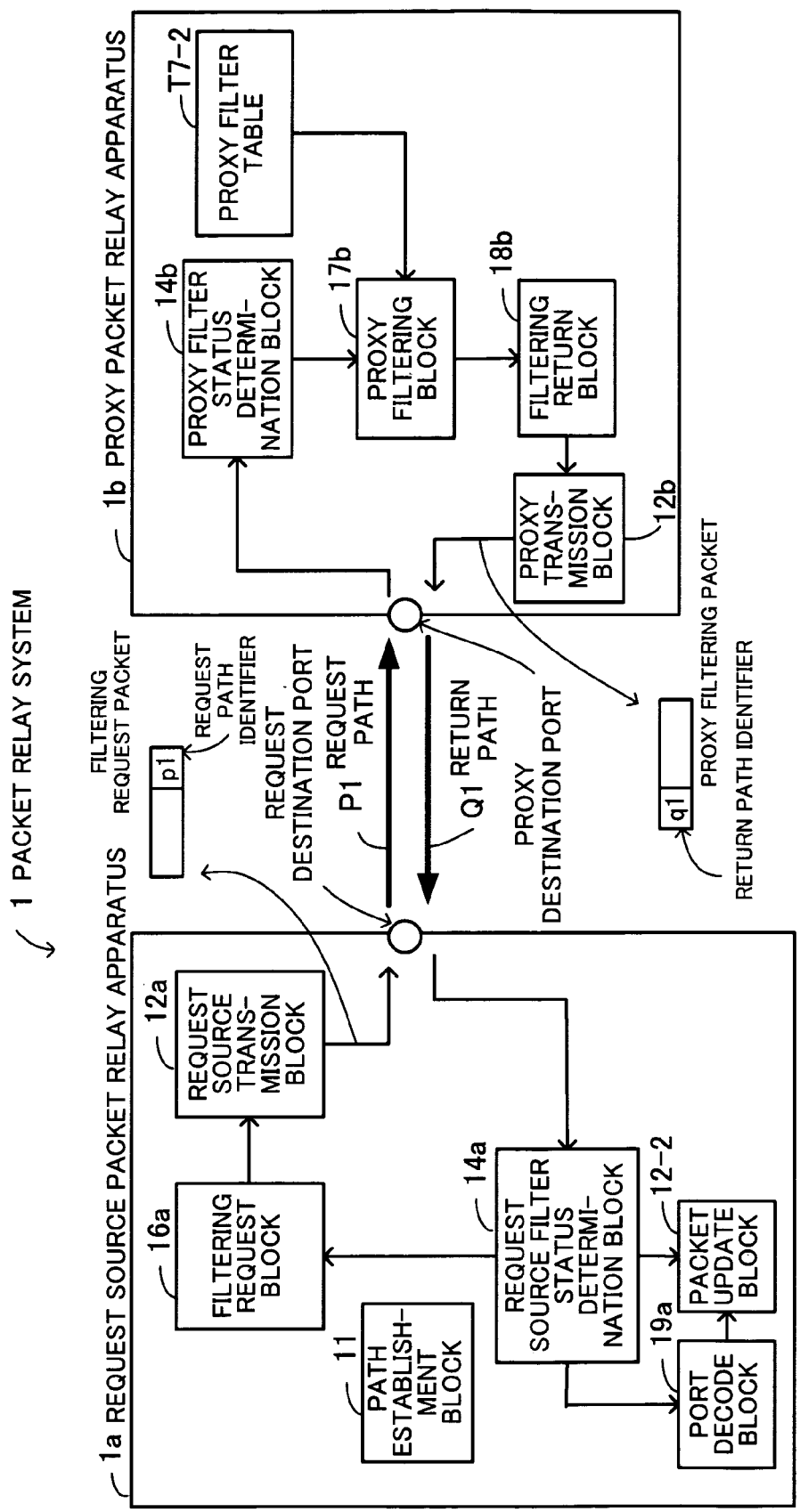
FIG. 1 is a view showing the principle of a packet relay system.

Embodiments of the present invention will be described with reference to the drawings. FIG. 1 is a view showing the principle of a packet relay system 1 which filters packets and relays packet communication on a network. The packet relay system 1 includes a request source packet relay apparatus 1a and a proxy packet relay apparatus 1b.

For convenience in description, the request source packet relay apparatus 1a and the proxy packet relay apparatus 1b are separated, but a single node (such as a router) on the network may have both functions of the request source packet relay apparatus 1a and the proxy packet relay apparatus 1b.

The request source packet relay apparatus 1a includes a path establishment block 11, a request source filter status determination block 14a, a filtering request block 16a, a request source transmission block 12a, a packet update block 12-2, and a port decode block 19a.

The path establishment block 11 establishes beforehand a request path P1 on which a received packet is sent to a proxy apparatus requested to perform proxy filtering of the packet and a return path Q1 on which the packet proxy-filtered by the proxy apparatus is received.

The request source filter status determination block 14a determines whether the received packet requires a request that another apparatus perform proxy filtering, does not require the request, or has already been proxy-filtered. If the packet requires the request, the request source filter status determination block 14a obtains a request destination port used to send the packet to the proxy apparatus (proxy packet relay apparatus 1b) and the identifier of the request path P1, which is p1 here.

The filtering request block 16a inserts the request path identifier p1 into the packet to generate a filtering request packet. The request source transmission block 12a sends the filtering request packet from the request destination port to the proxy apparatus.

If the request source filter status determination block 14a determines that the received packet has already been proxy-filtered, the packet update block 12-2 deletes the return path identifier, which is q1 here, from the packet, updates the header information, and normally relays the packet.

The proxy packet relay apparatus 1b includes a proxy filter status determination block 14b, a proxy filter table T7-2, a proxy filtering block 17b, a filtering return block 18b, and a proxy transmission block 12b.

The proxy filter status determination block 14b receives a proxy filtering packet and determines whether the packet requires proxy filtering or not, if the packet contains the request path identifier p1. If proxy filtering is required, the proxy filter status determination block 14b obtains a proxy destination port used to send the packet to the request source packet relay apparatus 1a and a return path identifier, which is q1 here.

The proxy filter table T7-2 specifies the conditions of filtering of the received packet, or a filter rule. If proxy filtering is performed, the proxy filtering block 17b determines whether the filtering request packet can be relayed or should be discarded by searching through the proxy filter table T7-2 using the request path identifier p1 as a key.

If the packet can be relayed, the filtering return block 18b generates a proxy filtering packet by deleting the request path identifier p1 from the filtering request packet and inserting the return path identifier q1. The proxy transmission block 12b performs loopback transmission of the proxy filtering packet from the proxy destination port to the request source packet relay apparatus 1a.

Figure 2:
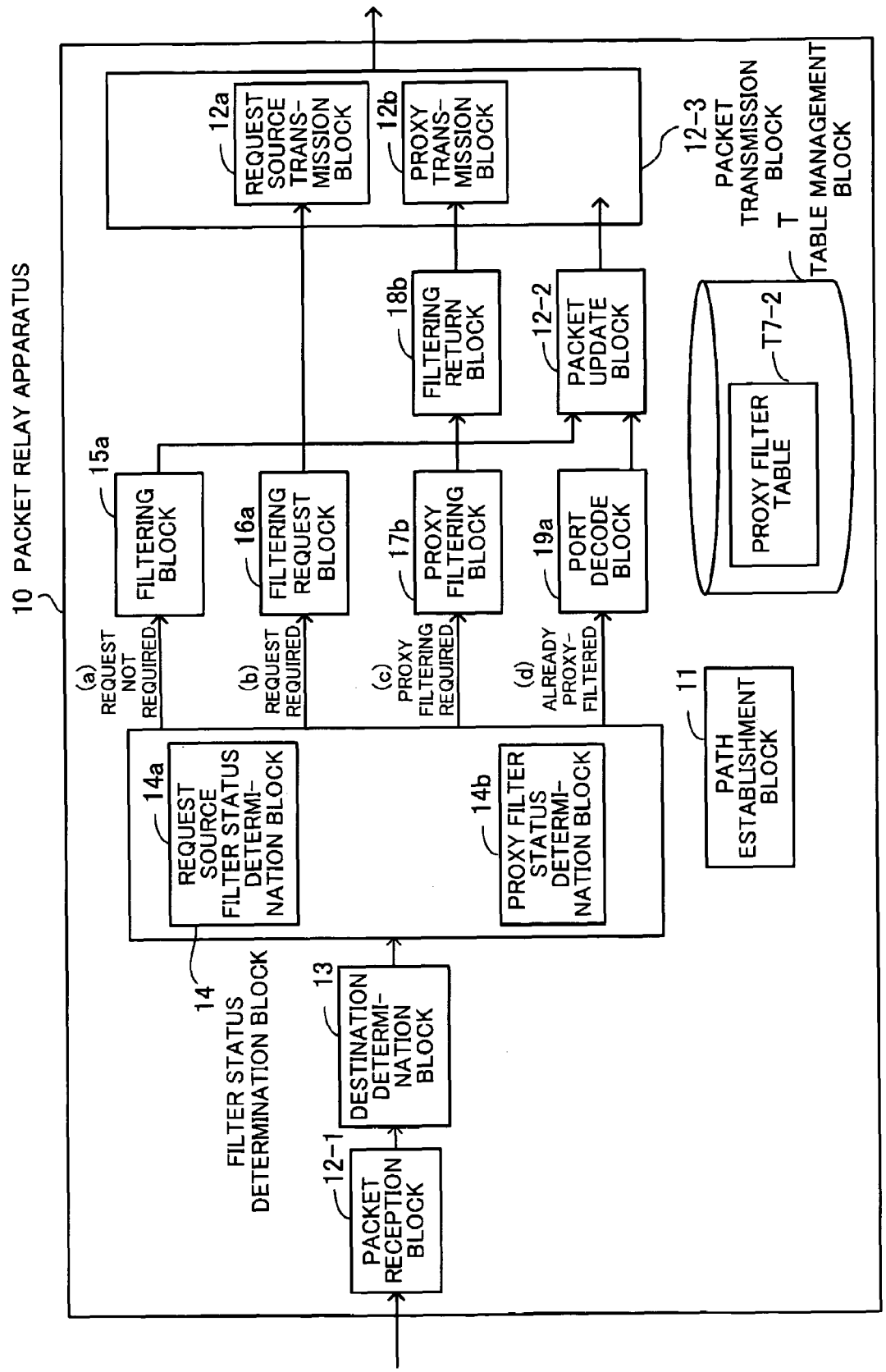
FIG. 2 is a view showing the configuration of a packet relay apparatus.

A packet relay apparatus 10 having both functions of the request source packet relay apparatus 1a and the proxy packet relay apparatus 1b will next be described. FIG. 2 is a view showing the configuration of the packet relay apparatus 10.

The packet relay apparatus 10 is a node on a network, such as a router. The packet relay apparatus 10 includes a table management block T, a path establishment block 11, a packet reception block 12-1, a destination determination block 13, a filter status determination block 14, a filtering block 15a, a filtering request block 16a, a proxy filtering block 17b, a filtering return block 18b, a port decode block 19a, a packet update block 12-2, and a packet transmission block 12-3. Elements identical to those shown in FIG. 1 are denoted by the same reference symbols, and a description thereof will be omitted.

The table management block T includes the proxy filter table T7-2 shown in FIG. 1, and stores and manages other tables required for filtering and packet relaying. The tables stored and managed in the table management block T are shown in FIGS. 5 to 10. The packet reception block 12-1 receives a packet. The destination determination block 13 determines a destination to relay the received packet to a next node. The destination determination processing of layer 2 or layer 3 is performed basically, but the destination may be determined in accordance with the TCP or UDP port number.

The filter status determination block 14 includes the request source filter status determination block 14a and the proxy filter status determination block 14b shown in FIG. 1. If the apparatus requests that a peripheral apparatus perform filtering, the function of the request source filter status determination block 14a works. If the apparatus performs proxy filtering, the function of the proxy filter status determination block 14b works.

The port decode block 19a decodes a received port number in accordance with the return path identifier, to know which port originally received the packet returned after proxy filtering. The packet transmission block 12-3 includes the request source transmission block 12a and the proxy transmission block 12b shown in FIG. 1, and sends the packet.

If a multicast packet is relayed, the packet update block 12-2 replicates the packet, then updates the header related to the layer-3 relay information. If the layer-2 relay information indicates that the destination port matches the reception port, the corresponding packet is discarded. This type of filtering will be hereafter referred to as dynamic filtering.

The path establishment block 11 of the packet relay apparatus 10 establishes a request path P1 and a return path Q1 in advance. When a packet is received, the destination is determined, and the filter status determination block 14 handles the packet, as indicated in (a) to (d) below:

(a) When a Filtering Request to Another Node is Not Required:

The packet relay apparatus 10 performs normal filtering. If the filtering result is "permit", the packet relay apparatus 10 updates the header information and sends the packet. If the filtering result is "deny", the packet relay apparatus 10 discards the packet.

(b) When a Filtering Request to Another Node is Required:

The filtering request block 16a of the packet relay apparatus 10 sends the packet through the request path to the request destination node. In that case, the destination information obtained by the destination determination block 13 is overwritten by the request destination information, which is a request destination port and a request path identifier, obtained by the filter status determination block 14.

(c) When Proxy Filtering is Performed:

The proxy filtering block 17b of the packet relay apparatus 10 performs packet filtering, using the packet headers and the request path identifier inserted in the packet.

If the filtering result is "permit", the filtering return block 18b sends the packet through the return path to the request source node. In that case, the destination information obtained by the destination determination block 13 is overwritten by the return destination information, which is a proxy destination port and a return path identifier, obtained by the filter status determination block 14.

If the filtering result is "deny", the packet is discarded. If proxy filtering indicates that the packet is unauthorized, the packet is not returned to the request source but is discarded by the proxy apparatus.

(d) When a Packet Proxy-Filtered at Another Node is Received:

The port decode block 19a of the packet relay apparatus 10 decodes the reception port information obtained at the time of request. If the packet is a multicast relay packet, the packet update block 12-2 replicates the multicast packet, updates the header for layer-3 relaying, performs dynamic filtering for layer-2 relaying, and sends the packet to the destination given by the destination determination block 13.

Figure 3:
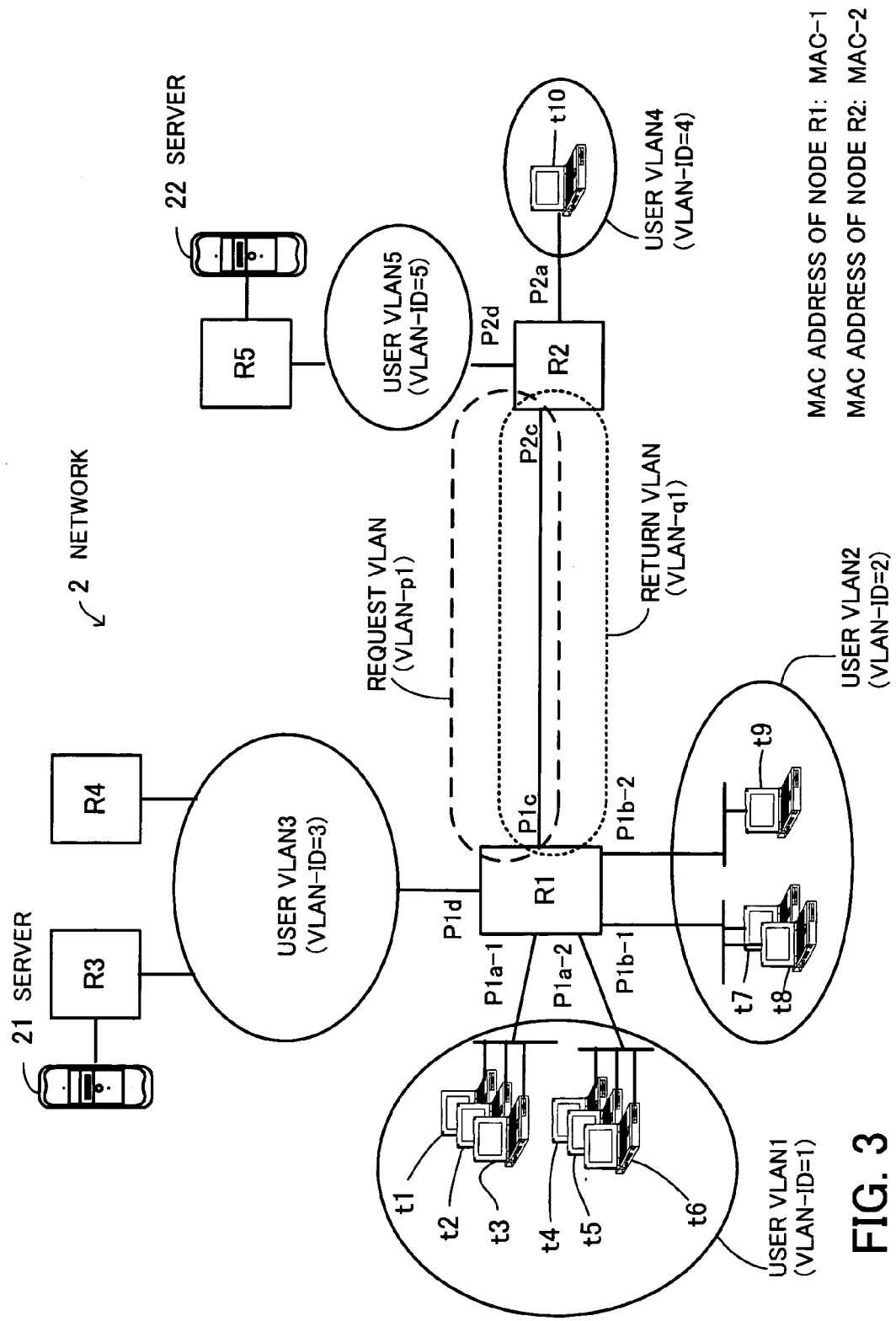
FIG. 3 is a view showing a network configuration.

A network configuration using the packet relay system 1 will next be described. FIG. 3 is a view showing a network configuration. A network 2 includes nodes R1 to R5, user virtual local area networks (VLANs) VLAN1 to VLAN5, and servers 21 and 22.

User VLAN1 includes terminals t1 to t6. Terminals t1 to t3 are connected to a port having a port number P1a-1 (port P1a-1) of node R1, and terminals t4 to t6 are connected to port P1a-2 of node R1.

User VLAN2 includes terminals t7 to t9. Terminals t7 and t8 are connected to port P1b-1 of node R1, and terminal t9 is connected to port P1b-2 of node R1. User VLAN4 includes terminal t10, which is connected to port P2a of node R2.

User VLAN3 is connected to port P1d of node R1 and to nodes R3 and R4. User VLAN5 is connected to port P2d of node R2 and to node R5. A server 21 is connected to node R3, and a server 22 is connected to node R5. Port P1c of node R1 and port P2c of node R2 are connected. User VLAN1 to user VLAN5 have VLAN IDs 1 to 5 respectively.

Nodes R1 to R5 have the function of the packet relay apparatus 10 each. In the shown configuration, node R1 is the filtering request source, and proxy filtering is performed at node R2.

The path establishment block 11 of node R1 establishes a request path (request VLAN) connecting port P1c of node R1 and port P2c of node R2 and the corresponding return path (return VLAN) in advance. In the shown configuration, separate VLANs are established as the request path and the return path, but the request path and the return path may be a common path.

The VLAN IDs of the request VLAN and the return VLAN are p1 and q1 and are also denoted as request VLAN-p1 and return VLAN-q1 respectively. The ID values of the request VLAN and return VLAN should be unique values, differing from the VLAN IDs used in the network.

All the VLANs in the network 2 conform to IEEE 802.1Q. User VLAN1 is operated as an untagged port VLAN, which is identified by a port number, and request VLAN-p1 and return VLAN-q1 are operated as a tagged VLAN, which is identified by the VLAN ID. The packet relay ports such as port P1b-2 in the network 2 may be a physical port or a logical port collecting some physical ports by link aggregation or the like.

Suppose that nodes R1 to R5 meet the same function requirements and have the function of a brouter. If the destination MAC address of a packet matches the MAC address of the apparatus, layer 3 (Internet protocol: IP) is used to relay the packet. Otherwise, layer 2 is used. The MAC address of node R1 is MAC1, and the MAC address of node R2 is MAC2. The nodes in the shown configuration are brouters, but the nodes may be apparatuses supporting either layer 2 or layer 3.

The filter table of a filtering request node and assumed definitions of filtering performed by the network 2 will next be described. FIG. 4 is a view showing a filter table T0-1. The filter table T0-1 indicates filtering conditions specified before node R1 makes a filtering request. The table lists reception ports, reception VLAN IDs, transmission source MAC addresses, and filtering results.

Node R1 determines whether a received packet can be relayed or should be discarded by searching through the filter table T0-1 using the reception port, reception VLAN ID, and transmission source MAC of the received packet as a key.

If the reception port, reception VLAN ID, and transmission source MAC of the received packet are P1a-1, 1, and terminal t1 respectively, the filtering result is "permit", which means that the packet is relayed. If the reception port and the reception VLAN ID are P1a-1 and 1 respectively and if the transmission source MAC is something other than terminals t1 to t3, the filtering result is "deny", which means that the packet is discarded.

In the shown configuration, node R1 serves so many terminals that the filtering definitions cannot be stored in the filter table T0-1. The figure shows that the filtering definitions of a received packet related to port P1b-2 overflow the shown table. Node R2 serves a few terminals, and the filter table of node R2 has an available space. Node R2 performs proxy filtering of packets received from port P1b-2 of node R1.

Tables managed by the table management block T of each of nodes R1 and R2 will next be described. FIGS. 5 to 7 show the tables. The tables shown in FIGS. 5 to 7 indicate tables of node R1 needed for packet relaying and filtering in the network 2. These tables are stored and managed by the table management block T of node R1.

The tables will be briefly described here. A port VLAN table T1-1 shows correspondences between the reception ports and reception VLAN IDs. This table is referenced to recognize a reception VLAN from a packet without a VLAN tag.

A VLAN member table T2-1 shows a reception port group corresponding to a reception VLAN ID and links member port numbers to each VLAN. In the shown figure, entries of VLAN-p1 and VLAN-q1 are added.

A routing table T3-1 shows the relationship between the destination IP addresses and the next hop IP addresses. With an address resolution protocol (ARP) table T4-1, a MAC address can be obtained from an IP address. With a learning table T5-1, a destination port can be obtained from a reception VLAN ID and a destination MAC address.

A filter status determination table T6-1 stores the filter statuses of received packets, which are request required, request not required, proxy filtering required, and proxy-filtered, the request destination information, and the return destination information. In the shown table, the entries of VLAN-p1 and VLAN-q1 are added.

A filter table T7-1 specifies filtering definitions. A port decode table T8-1 shows the correspondence between the returned VLAN ID and the original reception port. The shown table is used when node R1 which receives a packet returned after proxy filtering performs dynamic filtering for the reception port P1b-2.

Figure 10:
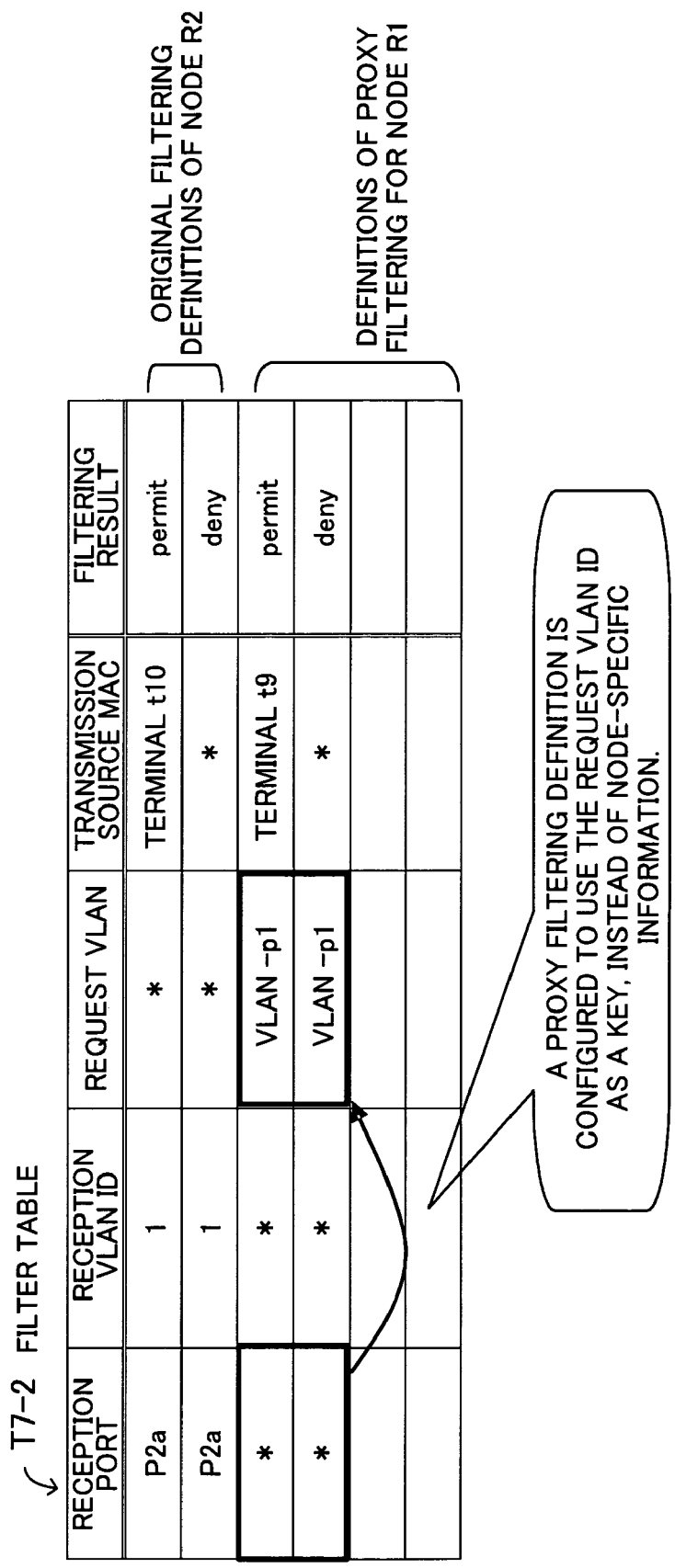
FIG. 10 shows more tables.

FIGS. 8 to 10 show tables. The tables shown in FIGS. 8 to 10 are required at node R2 for packet relaying and filtering in the network 2. These tables are stored and managed by the table management block T of node R2.

A filter table T7-2 of node R2, which corresponds to the proxy filter table T7-2 shown in FIG. 1, stores the definitions of filtering to be originally performed at node R2 and the definitions of proxy filtering for node R1 (entries for proxy filtering).

If node R2 performs proxy filtering, the filter table T7-2 is searched through not by node-specific information such as a reception port number but by the request VLAN ID, and VLAN-p1 is specified accordingly. In other respects, the table is the same as the table of node R1, and description thereof is omitted. The network administrator can give any setting in the tables managed by nodes R1 and R2 by using a command.

Figure 11:
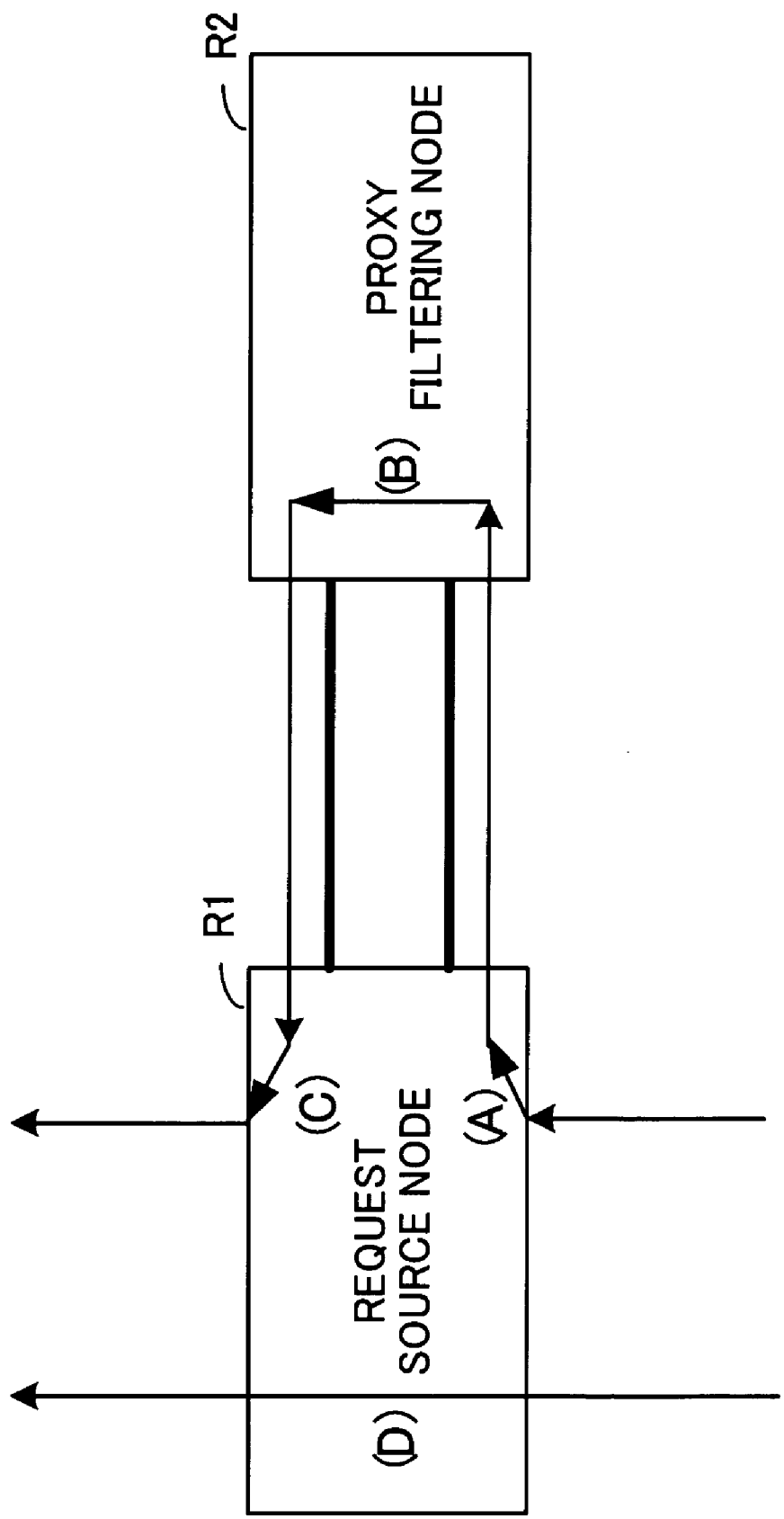
FIG. 11 is a view showing the processing flow of relay nodes.

The operations of nodes R1 and R2 after the paths (VLANs) are established and the tables are set up in the network 2 will next be described. FIG. 11 is a view showing the relay processing flow of nodes R1 and R2. In segments A, B, and C, filtering is requested and proxy filtering is performed. Node R1 makes a filtering request in segment A; node R2 performs proxy filtering in segment B; and node R1 sends the proxy-filtered packet to the original destination in segment C. In segment D, node R1 performs filtering.

Segment D, or normal filtering in node R1, will be described first, by describing the operation of each element.

Suppose that node R1 receives an IP packet having the following information from port P1a-1: transmission source MAC=terminal t1; destination MAC=MAC-1 (unicast); no VLAN tag; destination IP=server 21.

[Packet Reception Block 12-1]

The packet reception block 12-1 determines the reception VLAN ID and distinguishes between relay layers.

—Determining the Reception VLAN ID

If a packet without a VLAN tag is received, the reception VLAN is determined with reference to the port VLAN table T1-1. If a packet with a VLAN tag is received, the VLAN is determined in accordance with the VLAN ID included in the packet. The entry of P1a-1 in the port VLAN table T1-1 is referenced here, and the reception VLAN ID 1 is recognized.

The VLAN member table. T2-1 is searched through by the reception VLAN ID to find that the reception port P1a-1 belongs to the VLAN (VLAN ID 1). So, the packet is received. Any packet coming from a non-member port will be discarded.

—Distinguishing Between Relay Layers

With reference to the destination MAC address and IP address of the packet, the relay layers are distinguished as follows:

(1) If the Destination Mac Address is a Multicast Address

Destination MAC address=01:00:5e:0x:xx:xx: IP multicast

Designation MAC address≠01:00:5e:0x:xx:xx: Layer-2 multicast

"01:00:5e:0x:xx:xx" means that the higher-order 25 bits are a fixed hexadecimal value "01:00:5e:0".

(2) If the Destination Mac Address is not a Multicast Address

Destination MAC address=local apparatus MAC: IP unicast

Destination MAC address≠local apparatus MAC: Layer-2 unicast

Whether the eighth bit from the MSB is "1" indicates whether the destination MAC address is a multicast address. The MAC address of the local apparatus at node R1 is MAC-1, and IP unicast processing is recognized here.

[Destination Determination Block 13]

The destination determination block 13 of layer 3 determines the destination. The destination determination block 13 searches through the routing table T3-1 and the ARP table T4-1, recognizes that the next hop node is node R3, and obtains transmission parameters (destination port, transmission VLAN ID, destination MAC) accordingly.

[Filter Status Determination Block 14]

The filter status determination block 14 searches through the filter status determination table T6-1 and determines from the second entry that a filtering request is not required. If the result of filtering is "deny", the packet is discarded.

[Packet Update Block 12-2, Packet Transmission Block 12-3]

The packet update block 12-2 updates the IP/MAC header, and the packet transmission block 12-3 sends the IP packet with the updated header to node R3.

In a first embodiment, a filtering request is made and proxy filtering is performed in unicast relaying. The operation of the elements in segments A, B, and C shown in FIG. 11 will be described.

(A) Segment in which Node R1 Makes a Filtering Request

Suppose that node R1 receives the following IP packet from port P1$b$-2: transmission source MAC=terminal t9; destination MAC=MAC-1 (unicast); no VLAN tag; destination IP=server 21.

[Packet Reception Block 12-1]

The packet update block 12-2 recognizes the reception VLAN ID 2 and searches through the VLAN member table T2-1 by the reception VLAN ID. Because the reception port P1$b$-2 belongs to the VLAN, the packet reception block 12-1 receives the packet and recognizes that the packet is subjected to IP unicast processing.

[Destination Determination Block 13]

The destination determination block 13 of layer 3 determines the destination. The destination determination block 13 searches through the routing table T3-1 and the ARP table T4-1, finds that the next hop node is node R3, and obtains transmission parameters (destination port, transmission VLAN ID, destination MAC).

[Filter Status Determination Block 14]

The filter status determination block 14 searches through the filter status determination table T6-1 and determines from the fourth entry that a filtering request is required. The filter status determination block 14 also obtains the request destination node information (destination port=P1$c$; transmission VLAN ID=VLAN-p1) and the header operation information (tag insertion). P1$c$ is the request destination port, and VLAN-p1 is the request path identifier.

The transmission parameters (destination port, transmission VLAN ID, destination MAC) obtained by the destination determination block 13 are overwritten by the request destination node information obtained from the filter status determination table T6-1.

[Filtering Request Block 16$a$]

The filtering request block 16$a$ inserts a filtering request path identifier into the packet in accordance with the information obtained from the filter status determination table T6-1. More specifically, the filtering request block 16$a$ inserts VLAN-p1 as a VLAN tag into the packet. (The packet format will be described later.)

[Packet Transmission Block 12-3]

The packet transmission block 12-3 sends the packet from the destination port P1$c$ in accordance with the information obtained from the filter status determination table T6-1.

(B) Segment in which Proxy Filtering is Performed at Node R2

Node R2 receives the following IP packet from port P2$c$: transmission source MAC=terminal t9; destination MAC=MAC-1; VLAN ID=VLAN-p1 (tagged VLAN); destination IP=server 21.

[Packet Reception Block 12-1]

The packet reception block 12-1 recognizes the reception VLAN ID VLAN-p1 and searches through the VLAN member table T2-1 by the reception VLAN ID. Because the reception port P2$c$ belongs to the VLAN, the packet reception block 12-1 receives the packet and recognizes that the packet is subjected to layer-2 unicast processing.

[Destination Determination Block 13]

The destination determination block 13 of layer 2 determines the destination. The destination determination block 13 searches through the learning table T5-2 and finds no hit. Then, the destination determination block 13 searches through the VLAN member table T2-2 and obtains destination port group information.

[Filter Status Determination Block 14]

The filter status determination block 14 searches through the filter status determination table T6-2 and determines from the first entry that proxy filtering is required. When the determination is made, all the destination information obtained by the destination determination block 13 becomes invalid. The filter status determination block 14 obtains return destination node information (destination port=P2$c$; transmission VLAN ID=VLAN-q1) and header operation information (tag replacement). (P2$c$ is the proxy destination port, and VLAN-q1 is the return path identifier.)

The transmission parameter information obtained by the destination determination block 13 is overwritten here by the return destination node information obtained from the filter status determination table T6-2.

[Proxy Filtering Block 17$b$]

The proxy filtering block 17$b$ searches through the filter table T7-2 not by the reception port number P2$c$ but by the request VLAN ID VLAN-p1. The proxy filtering block 17$b$ determines from the third entry of the filter table T7-2 that the result of filtering is "permit".

If the port number P2$c$ received from node R2 is used as a key of proxy filtering, node R2 cannot filter packets received from the reception port number P2$c$. Therefore, when node R2 performs proxy filtering for node R1, the filter table T7-2 is searched through by the VLAN ID VLAN-p1 instead of the reception port number P2$c$, so that proxy filtering for R1 can be executed.

[Filtering Return Block 18*b*]

The filtering return block 18*b* replaces the VLAN ID in the VLAN tag of the packet by VLAN-q1 (deletes VLAN-p1 and enters VLAN-q1), in accordance with the information obtained from the filter status determination table T6-2.

[Packet Transmission Block 12-3]

The packet transmission block 12-3 sends the packet from the destination port P2*c*, in accordance with the information obtained from the filter status determination table T6-2. Unlike normal layer-2 relaying, dynamic filtering is not performed.

(C) Segment in which a Proxy-Filtered Packet is Sent from Node R1 to the Original Destination Node R1 receives the following IP packet from port P1*c*: transmission source MAC=terminal t9; destination MAC=MAC-1; VLAN ID=VLAN-q1 (tagged VLAN); destination IP=server 21.

[Packet Reception Block 12-1]

The packet reception block 12-1 recognizes the reception VLAN ID VLAN-q1 and searches through the VLAN member table by the reception VLAN ID. Because the reception port P1*c* belongs to the VLAN, the packet reception block 12-1 receives the packet and recognizes that the packet is subjected to IP unicast processing.

[Destination Determination Block 13]

The destination determination block 13 of layer 3 determines the destination. The destination determination block 13 searches through the routing table T3-1 and the ARP table T4-1, finds that the next hop node is node R3; and obtains transmission parameters (destination port, transmission VLAN ID, destination MAC).

[Filter Status Determination Block 14]

The filter status determination block 14 searches through the filter status determination table T6-1 and determines from the first entry that proxy filtering has already been performed. The filter status determination block 14 also obtains header operation information (tag deletion).

[Port Decode Block 19*a*]

The port decode block 19*a* searches through the port decode table T8-1 by the return VLAN ID VLAN-q1 and obtains a reception port number P1*b*-2.

[Packet Update Block 12-2, Packet Transmission Block 12-3]

The packet update block 12-2 deletes the filter return VLAN tag VLAN-q1 from the packet, in accordance with the information obtained from the filter status determination table T6-1, and then updates the header in accordance with the relay layer. The packet transmission block 12-3 sends the packet.

Through the operation described above, a packet filtered by another node can be relayed and transmitted. Nodes R1 and R2 exchange the packet overwritten by the request destination node information and return destination node information, so that dynamic filtering does not occur when filtering is requested or when proxy filtering is performed. Even if the packet is looped back from node R2 to node R1, node R1 will not discard the filtered packet.

Figure 12:
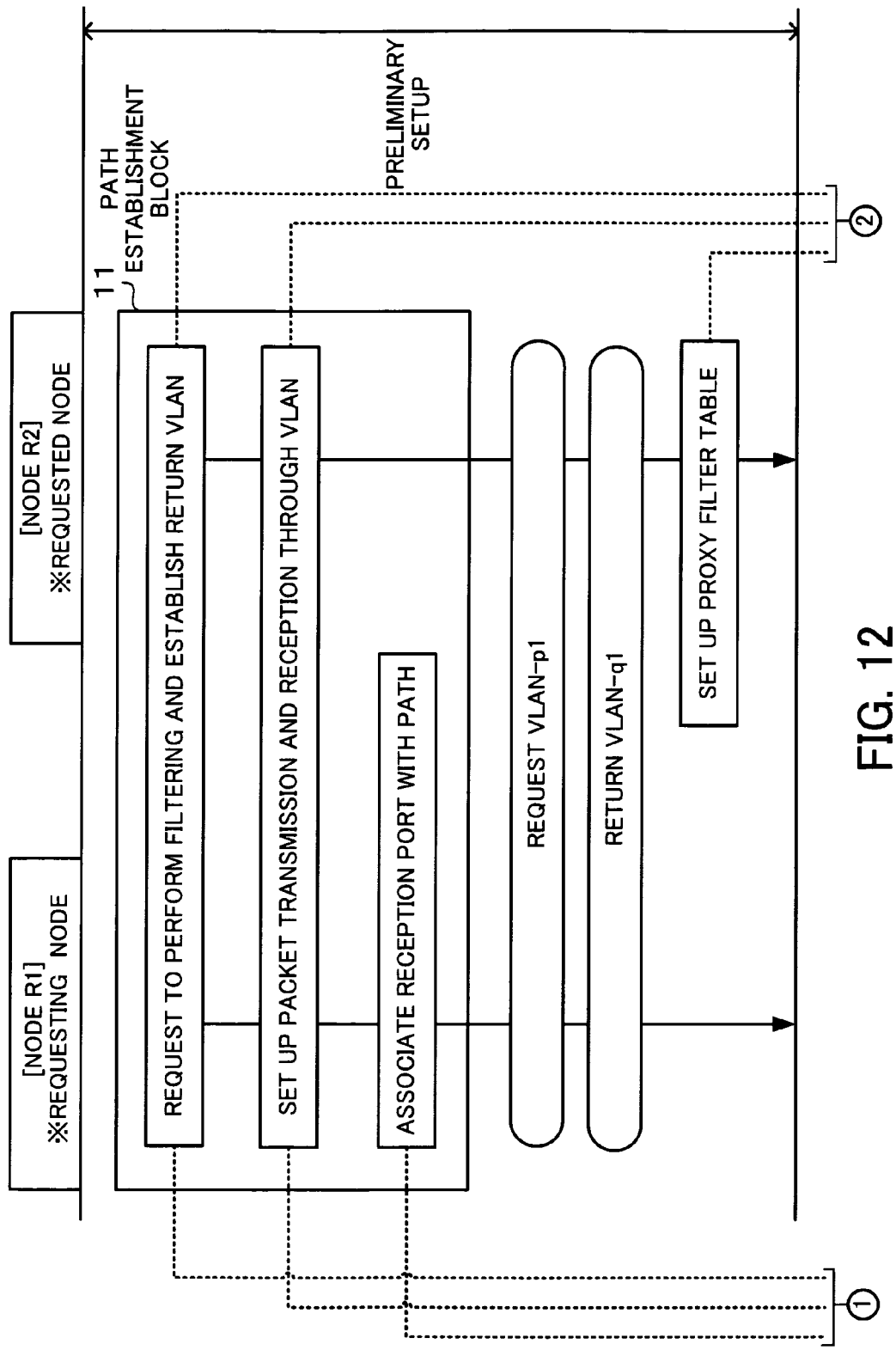
FIG. 12 is a flow chart showing the operation of the packet relay apparatus.
Figure 13:
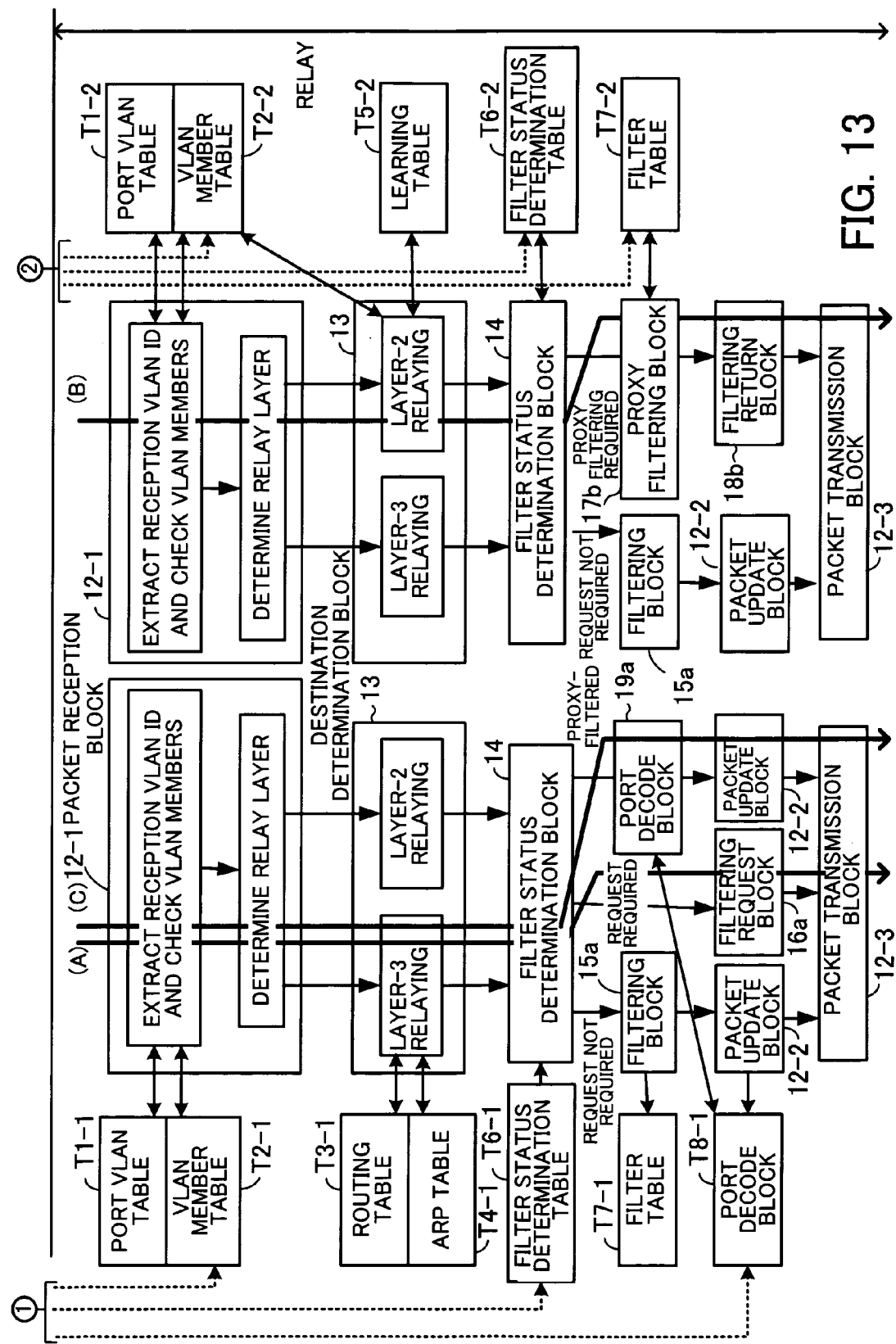
FIG. 13 is another flow chart showing the operation of the packet relay apparatus.

FIGS. 12 and 13 are flow charts showing the operation of the packet relay apparatus in the processing described above. A, B, and C in the figure correspond to A, B, and C shown in FIG. 11. Detailed description will not be repeated here.

Figure 14:
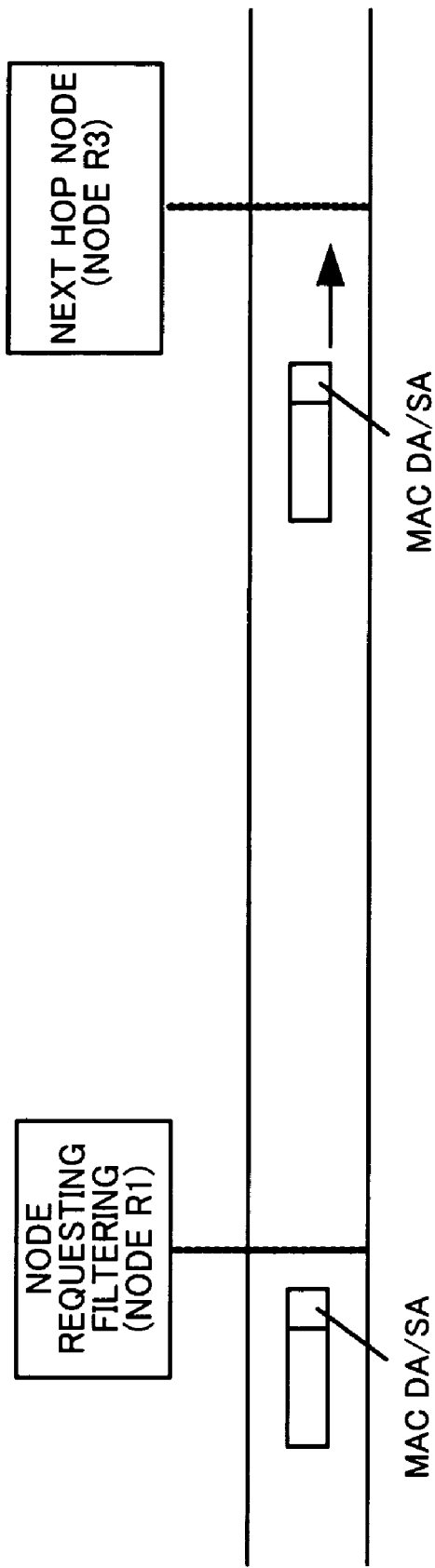
FIG. 14 is a view showing the flow of a packet without a filtering request.

The flow of a packet with or without a filtering request will next be described. FIG. 14 is a view showing the flow of a packet without a filtering request. When a packet without a filtering request is sent from node R1 to node R3, the packet includes header information such as the MAC destination address MAC_DA and the MAC transmission source address MAC_SA. This packet flows from node R1 to node R3.

Figure 15:
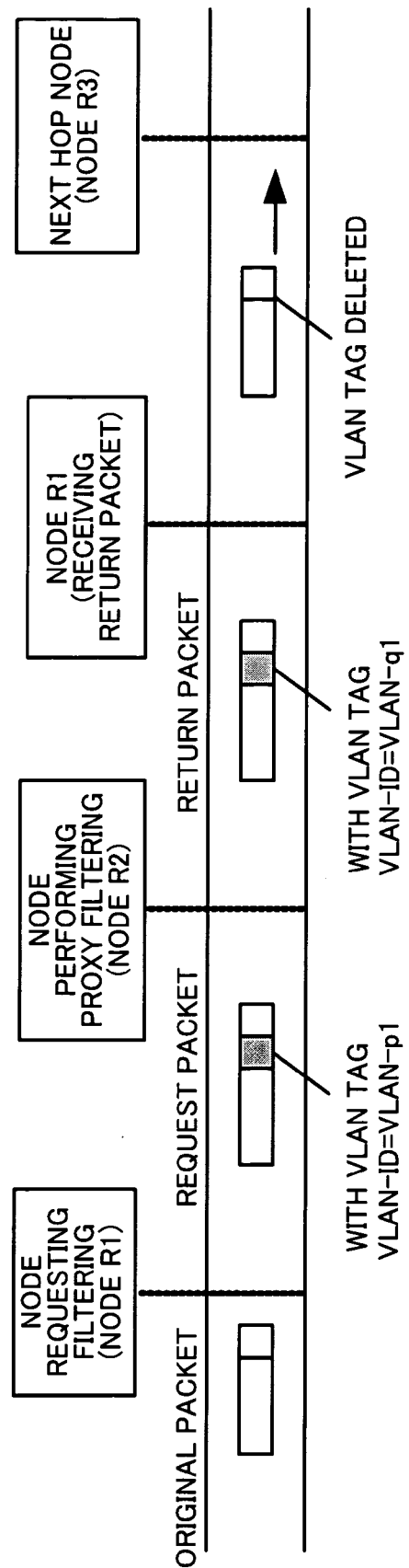
FIG. 15 is a view showing the flow of a packet with a filtering request.

FIG. 15 is a view showing the flow of a packet with a filtering request. The filtering request is made from node R1 to node R2, and the packet returned from node R2 is sent to node R3.

When node R1 makes a filtering request to node R2, node R1 inserts the VLAN ID VLAN-p1 into the packet and sends it. When node R2 returns the packet to node R1 after proxy filtering, node R2 deletes VLAN-p1 from and inserts VLAN-q1 into the packet and sends it. When node R1 sends the packet to node R3, VLAN-q1 is deleted, and the header information including MAC_DA and MAC_SA as usual is inserted.

Figure 16:
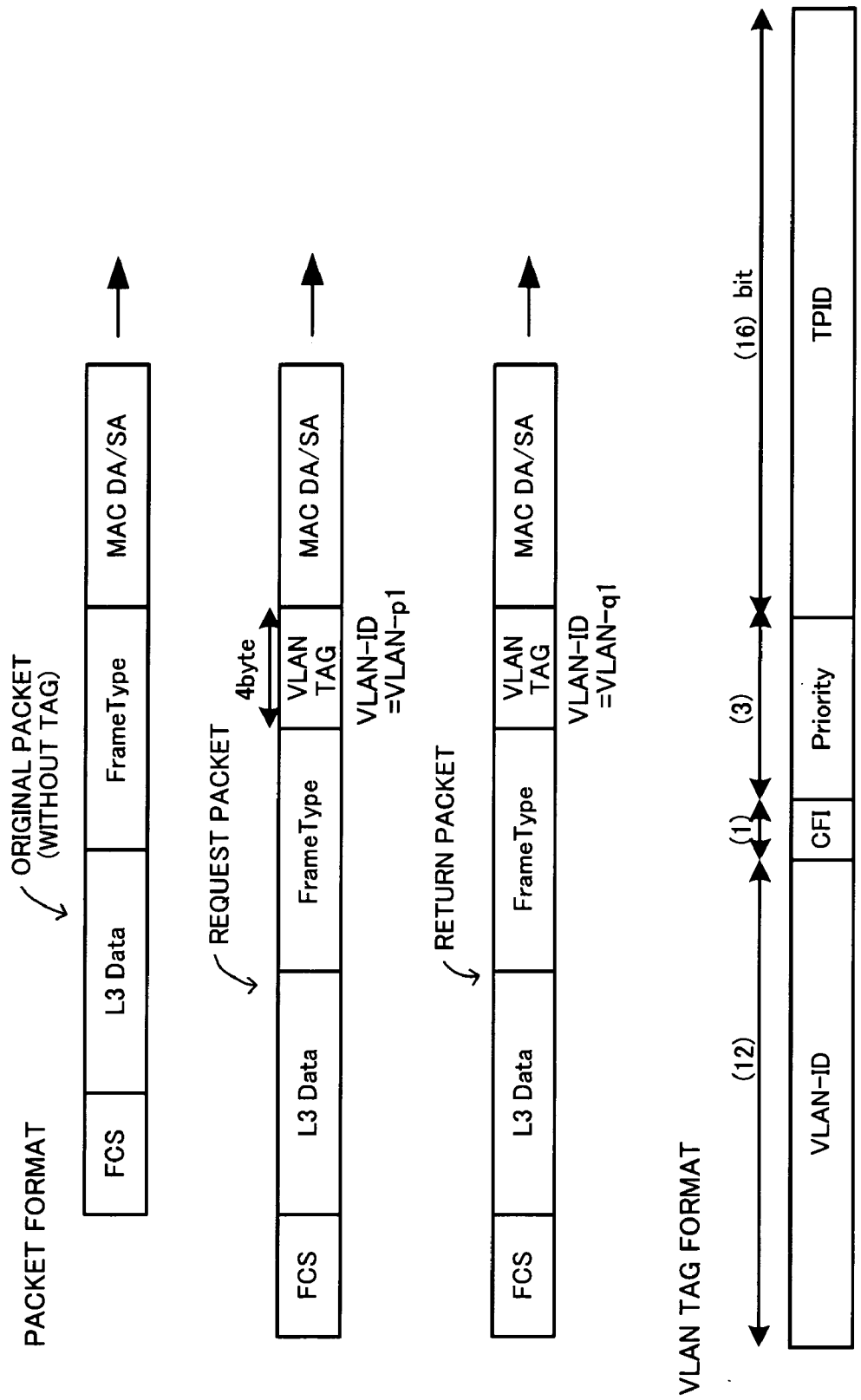
FIG. 16 is a view showing packet formats.

Packet formats will next be described. FIG. 16 is a view showing packet formats. The original packet includes a frame check sequence (FCS), L3 data, a frame type, and MAC_DA or MAC_SA.

The filtering request packet has a four-byte VLAN tag between the frame type and MAC_DA or MAC_SA. The VLAN tag includes the VLAN ID VLAN-p1.

The proxy-filtered return packet has a four-byte VLAN tag between the frame type and MAC_DA or MAC_SA. The VLAN tag includes the VLAN ID VLAN-q1.

The VLAN tag includes a 12-bit VLAN ID, a one-bit canonical format indicator (CFI), a three-bit priority element, and a 16-bit T0g protocol identifier (TPID).

Figure 17:
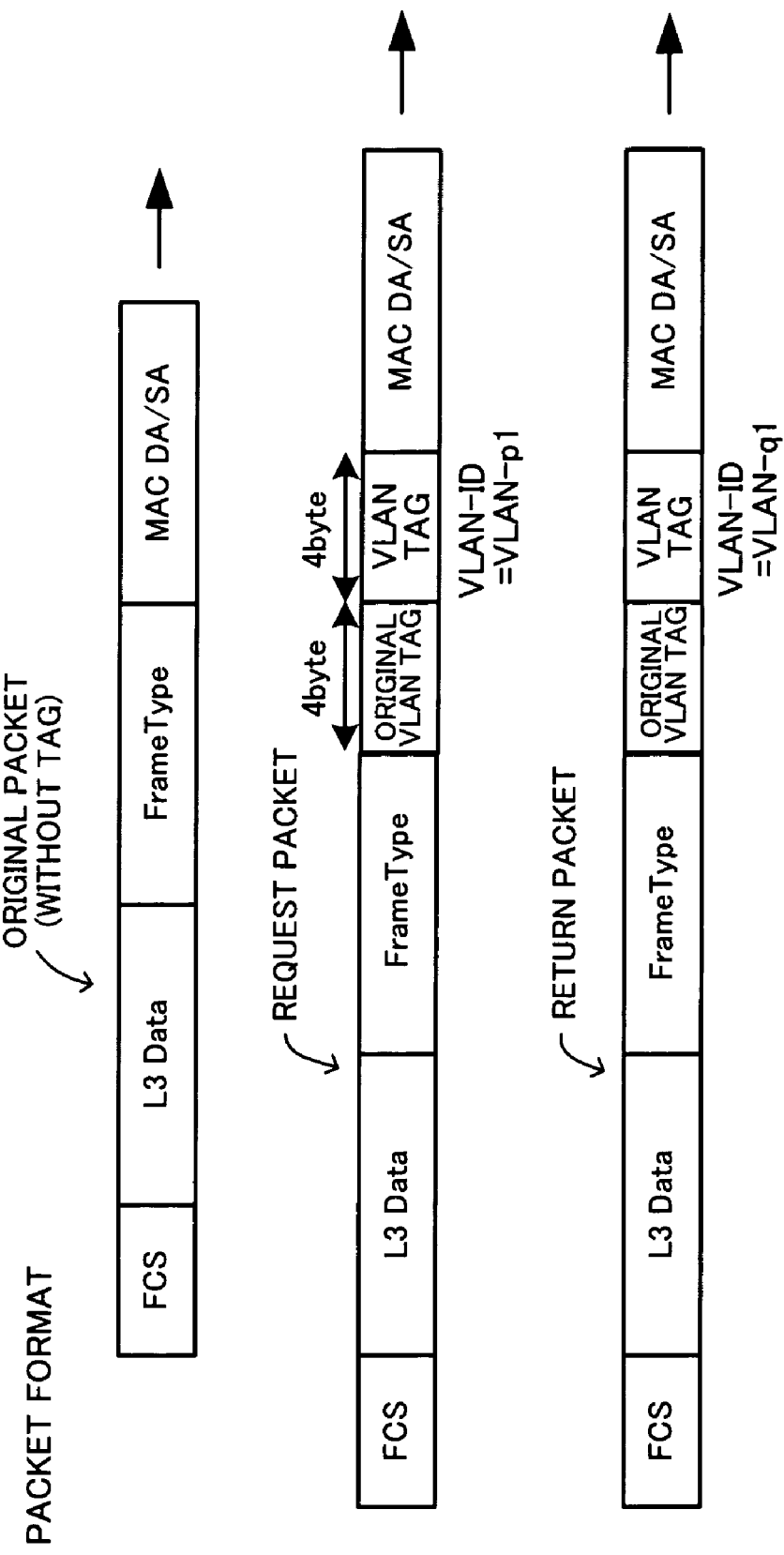
FIG. 17 is a view showing other packet formats.

FIG. 17 is a view showing other packet formats. If the packet received by node R1 already has a VLAN tag, a VLAN tag for proxy filtering is inserted before the original VLAN tag (the packet has two successive VLAN tags).

In a second embodiment, a filtering request is made and proxy filtering is performed in multicast relaying. Operations in segments A, B, and C shown in FIG. 11 will be described.

(A) Segment in which Node R1 Makes a Filtering Request

Suppose that node R1 receives the following IP packet from port P1*b*-2: transmission source MAC=terminal t9; destination MAC=01.00.5e.1.2.3; no VLAN tag; transmission source IP=IP_terminal-t9; destination IP=235.1.2.3 (IP multicast).

[Packet Reception Block 12-1]

The packet reception block 12-1 recognizes the reception VLAN ID 2 and searches through the VLAN member table T2-1 by the reception VLAN ID. Because the reception port P1*b*-2 belongs to the VLAN, the packet reception block 12-1 receives the packet and recognizes from the destination MAC address that the packet is subjected to IP multicast processing.

[Destination Determination Block 13]

The destination determination block 13 searches through a multicast routing table. FIG. 18 is a view showing the multicast routing table. The destination determination block 13 searches through the multicast routing table T9-1 and obtains the information of a relay layer used for the output to the destination ports P1*c*, P1*d*, P1*b*-1, and P1*b*-2 individually. In layer-3 relaying, the destination determination block 13 obtains the transmission VLAN ID as well. The multicast routing table T9-1 is managed also by the table management block T.

[Filter Status Determination Block 14]

When the filter status determination block 14 determines that a filtering request is required, the transmission parameter information obtained by the destination determination block 13 is overwritten by the request destination node information obtained from the filter status determination table T6-1.

[Filtering Request Block 16a, Packet Transmission Block 12-3]

A packet with a VLAN tag including the VLAN ID VLAN-p1 is sent to node R2.

(B) Segment in which Proxy Filtering is Performed at Node R2

Node R2 receives the following IP packet from port P2c: transmission source MAC=terminal t9; destination MAC=01.00.5e.1.2.3; VLAN ID=VLAN-p1 (tagged VLAN); destination IP=IP_terminal-t9; destination IP=235.1.2.3 (IP multicast).

[Packet Reception Block 12-1]

The packet reception block 12-1 recognizes the reception VLAN ID VLAN-p1 and searches through the VLAN member table T2-2 by the reception VLAN ID. Because the reception port P2c belongs to the VLAN, the packet reception block 12-1 receives the packet and recognizes from the destination MAC address that the packet is subjected to IP multicast processing.

[Destination Determination Block 13, Filter Status Determination Block 14, Proxy Filtering Block 17b, Filtering Return Block 18b, Packet Transmission Block 12-3]

Proxy filtering is performed as in the first embodiment, and the packet is returned to node R1.

(C) Segment in which a Proxy-Filtered Packet is Sent from Node R1 to the Original Destination Node R1 receives the following IP packet from port P1c: transmission source MAC=terminal t9; destination MAC=01.00.5e.1.2.3; VLAN ID=VLAN-q1 (tagged VLAN); transmission source IP=IP_terminal-t9; destination IP=235.1.2.3 (IP multicast).

[Packet Reception Block 12-1]

The packet reception block 12-1 recognizes the reception VLAN ID VLAN-q1 and searches through the VLAN member table T2-1 by the reception VLAN ID. Because the reception port P1c belongs to the VLAN, the packet reception block 12-1 receives the packet and recognizes from the destination MAC address that the packet is subjected to IP multicast processing.

[Destination Determination Block 13]

The destination determination block 13 searches through the multicast routing table T9-1 and obtains a relay layer used for the output to the destination ports P1c, P1d, and P1b-1 individually. For layer-3 relaying, the transmission VLAN ID is also obtained.

[Filter Status Determination Block 14]

The filter status determination block 14 searches through the filter status determination table T6-1 and recognizes from the first entry that proxy filtering has already been performed. The header operation information is also obtained.

[Port Decode Block 19a]

The port decode block 19a searches through the port decode table T8-1 by the return VLAN ID VLAN-q1 and obtains the reception port number P1b-2.

[Packet Update Block 12-2, Packet Transmission Block 12-3]

The packet update block 12-2 deletes the filtering return VLAN tag from the packet in accordance with the information obtained from the filter status determination table T6-1. The subsequent processing differs from the update processing in normal packet relaying just in that the reception port is decoded from the return VLAN ID value.

The packet is replicated for multicasting to the destination ports P1c, P1d, P1b-1, and P1b-2. Then, the IP or MAC header is updated in the packets addressed to P1c and P1d, which are determined to be relayed on layer 3 by the destination determination block 13, and the packet transmission block 12-3 sends the packets.

With regard to each of the packets addressed to P1b-1 and P1b-2 determined to be relayed on layer 2, the reception port P1b-2, obtained by the port decode block 19a, and the transmission port are compared. If they match, the packet is discarded. Otherwise, the packet transmission block 12-3 sends the packet as it is (dynamic filtering). The operation described above allows a filtering request to be made to another node and proxy filtering to be performed.

In a third embodiment, the packets are filtered by the reception port, transmission port, and transmission source MAC. The transmission port is newly included. Multicast relaying is assumed. In the second embodiment, packet replication in multicast relaying is performed at node R1 after loopback. In the third embodiment, packet replication is performed before loopback. The packets are replicated before sent to node R2, then a filtering request is made.

[Desired Filtering Definitions]

The filter key is a combination of the reception port, the transmission port, and the transmission source MAC. Suppose that the network administrator notices that the filter table T0-1 shown in FIG. 4 cannot store all the definitions of node R1, and establishes such a system that the packets of the reception port P1b-2 and the transmission port P1d of node R1 are filtered at node R2.

Figure 20:
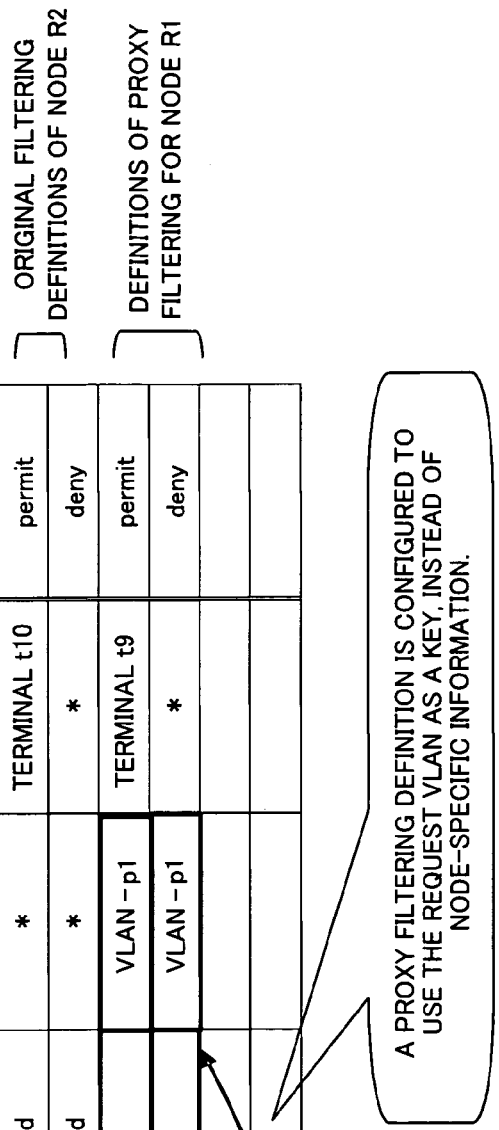
FIG. 20 shows another filter status determination table and another filter table.

FIG. 19 shows the filter status determination table T6a-1 and the filter table T7a-1 of node R1. FIG. 20 shows the filter status determination table T6a-2 and the filter table T7a-2 of node R2. The tables are generally the same as the tables shown in FIGS. 5 to 10, and only the differences are indicated in the tables shown in FIGS. 19 and 20.

[Preliminary Configuration by the Network Administrator]

The path establishment block 11 establishes a filter request VLAN and a return VLAN between nodes R1 and R2, associated with the reception port P1b-2, the transmission port P1d, and relay layer 3. The VLAN member tables T2-1 and T2-2 used in the second embodiment are used. The filter status determination tables T6a-1 and T6a-2 differ from the filter status determination tables T6-1 and T6-2 used in the second embodiment in that the transmission port is added. Suggestive data related to a proxy-filtered packet includes the destination information corresponding to the received VLAN ID value, and the layer information in the updated header is also stored.

No port decode table is required. Because a multicast packet is replicated and subjected to dynamic filtering before it is transferred to the request destination node R2, the reception port does not need to be decoded after the packet is returned from node R2, in the third embodiment.

Proxy filtering is set up in the filter table T7a-2 of node R2. The request VLAN ID VLAN-p1 is specified as a filter key, instead of the reception port and transmission port, which are node-specific information. The shown entries including VLAN-p1 as a key have been added.

The flow of packet processing during the operation will next be described.

(A) Segment in which Node R1 Makes a Filtering Request

Suppose that node R1 receives the following IP packet from port P1b-2: transmission source MAC=terminal t9; destination MAC=01.00.5e.1.2.3; no VLAN tag; transmission source IP=IP_terminal-t9; destination IP=235.1.2.3 (IP multicast).

[Packet Reception Block 12-1]

The packet reception block 12-1 recognizes the reception VLAN ID 2 and searches through the VLAN member table T2-1 by the reception VLAN ID. Because the reception port P1b-2 belongs to the VLAN, the packet reception block 12-1 receives the packet and recognizes from the destination MAC address that the packet is subjected to IP multicast processing.

[Destination Determination Block 13]

The destination determination block 13 searches through the multicast routing table T9-1 and obtains the information of relay layers used for the output to the destination ports P1c, P1d, P1b-1, and P1b-2 individually. For layer-3 relaying, the transmission VLAN ID is also obtained.

[Filter Status Determination Block 14]

The filter status determination block 14 searches through the filter status determination table T6a-1 by a combination of the transmission port and the reception port determined by the destination determination block 13 and determines that the combination of the reception port P1b-2 and the transmission port P1d requires a filtering request.

[Packet Update Block 12-2]

The packet update block 12-2 replicates the packet and performs dynamic filtering before transferring the packet to node R2. As a result, packets addressed to P1c, P1d, and P1b-1 are generated.

The packets addressed to P1c and P1b-1 are filtered, the headers are updated, then the packets are transmitted.

The packet addressed to P1d is processed by the filtering request block 16a and the packet transmission block 12-3.

[Filtering Request Block 16a, Packet Transmission Block 12-3]

The packet with VLAN tag including VLAN ID VLAN-p1 is sent to node R2, as in the second embodiment.

(B) Segment in which Proxy Filtering is Performed at Node R2

Node R2 receives the following IP packet from port P2c: transmission source MAC=terminal t9; destination MAC=01.00.5e.1.2.3; VLAN ID=VLAN-p1 (tagged VLAN); transmission source IP=IP_terminal-t9; destination IP=235.1.2.3 (IP multicast).

[Packet Reception Block 12-1]

The packet reception block 12-1 recognizes the reception VLAN ID VLAN-p1 and searches through the VLAN member table T2-1 by the reception VLAN ID. Because the reception port P2c belongs to the VLAN, the packet reception block 12-1 receives the packet and recognizes from the destination MAC address that the packet is subjected to IP multicast processing.

[Destination Determination Block 13, Filter Status Determination Block 14, Proxy Filtering Block 17b, Filtering Return Block 18b, Packet Transmission Block 12-3]

Proxy filtering is performed, and the packet is returned to node R1, as in the first embodiment.

(C) Segment in which a Proxy-Filtered Packet is Sent from Node R1 to the Original Destination Node R1 receives the following IP packet from port P1c: transmission source MAC=terminal t9; destination MAC=01.00.5e.1.2.3; VLAN ID=VLAN-q1 (tagged VLAN); transmission source IP=IP_terminal-t9; destination IP=235.1.2.3 (IP multicast).

[Packet Reception Block 12-1]

The packet reception block 12-1 recognizes the reception VLAN ID VLAN-q1 and searches through the VLAN member table T2-1 by the reception VLAN ID. Because the reception port P1c belongs to the VLAN, the packet reception block 12-1 receives the packet and recognizes from the destination MAC address that the packet is subjected to IP multicast processing.

[Destination Determination Block 13]

The destination determination block 13 searches the multicast routing table T9-1 and obtains the information of relay layers used for the output to the destination ports P1c, P1d, and P1b-1 individually. For layer-3 relaying, the transmission VLAN ID is also obtained.

[Filter Status Determination Block 14]

The filter status determination block 14 searches through the filter status determination table T6a-1 and determines from the first entry that proxy filtering has already been performed. The transmission parameter information obtained by the destination determination block 13 is overwritten here by the request destination node information obtained from the filter status determination table T6a-1.

The header operation information is also obtained. It is determined from the filter status determination table T6a-1 that the packet is a layer-3 packet addressed to port P1d, among the packets replicated in the segment A, and the transmission VLAN ID value is also recognized.

[Packet Update Block 12-2, Packet Transmission Block 12-3]

The packet update block 12-2 deletes the filter return VLAN tag from the packet, in accordance with the information obtained from the filter status determination table T6a-1. Because the filter status determination table T6a-1 indicates that the packet is a layer-3 packet, the header is updated. Then, the packet transmission block 12-3 sends the packet. Through the operation, a filtering request can be made to another node.

The following modifications (1) to (4) can be made to the first to third embodiments:

(1) The path establishment block 11 establishes a request path and a return path, using a VLAN tag. The paths may use other tunnel protocols such as the IP tunnel. The path ID values may be inserted in a special header instead of the existing protocol header.

Figure 21:
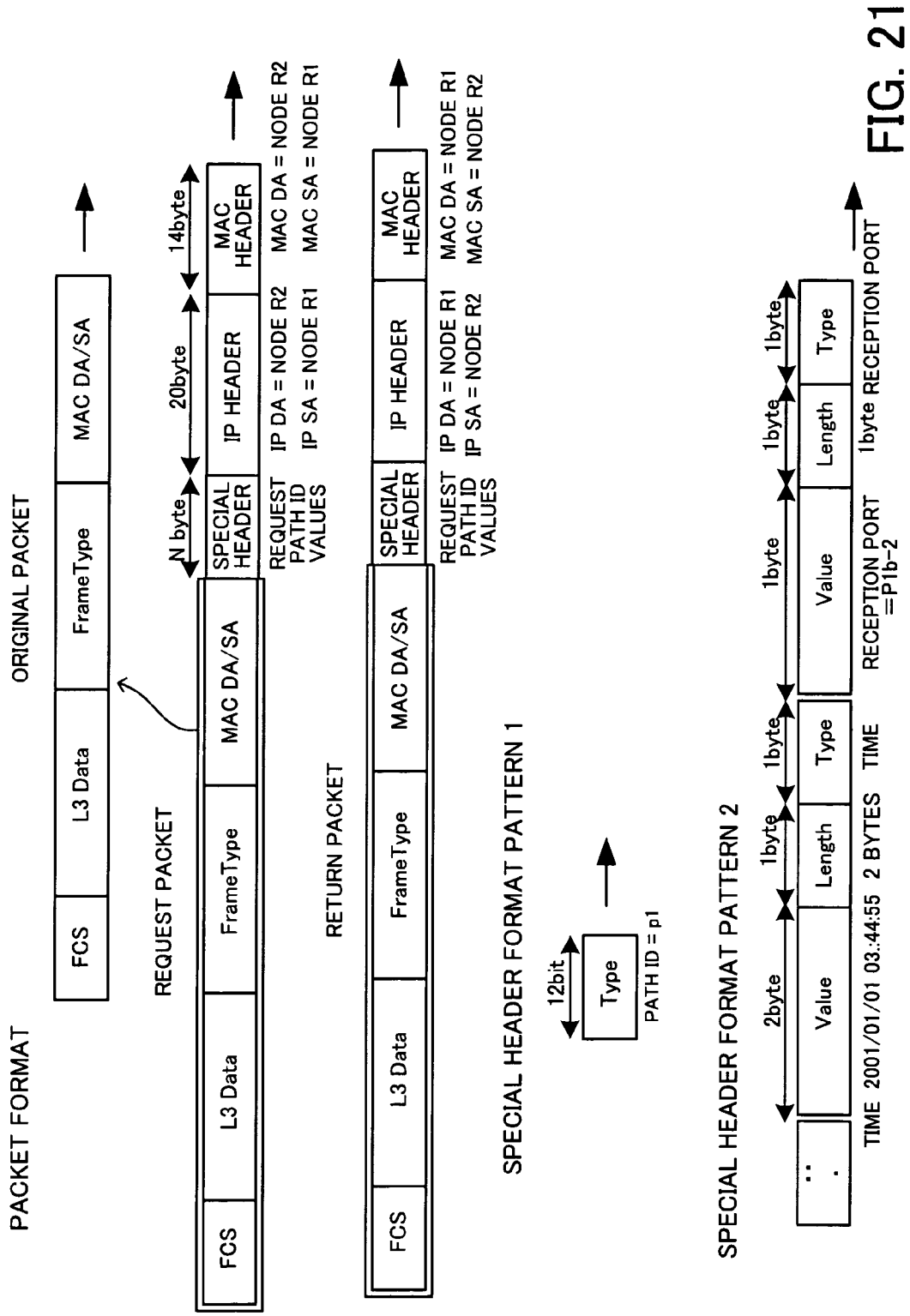
FIG. 21 is a view showing packet formats having a special header.
Figure 22:
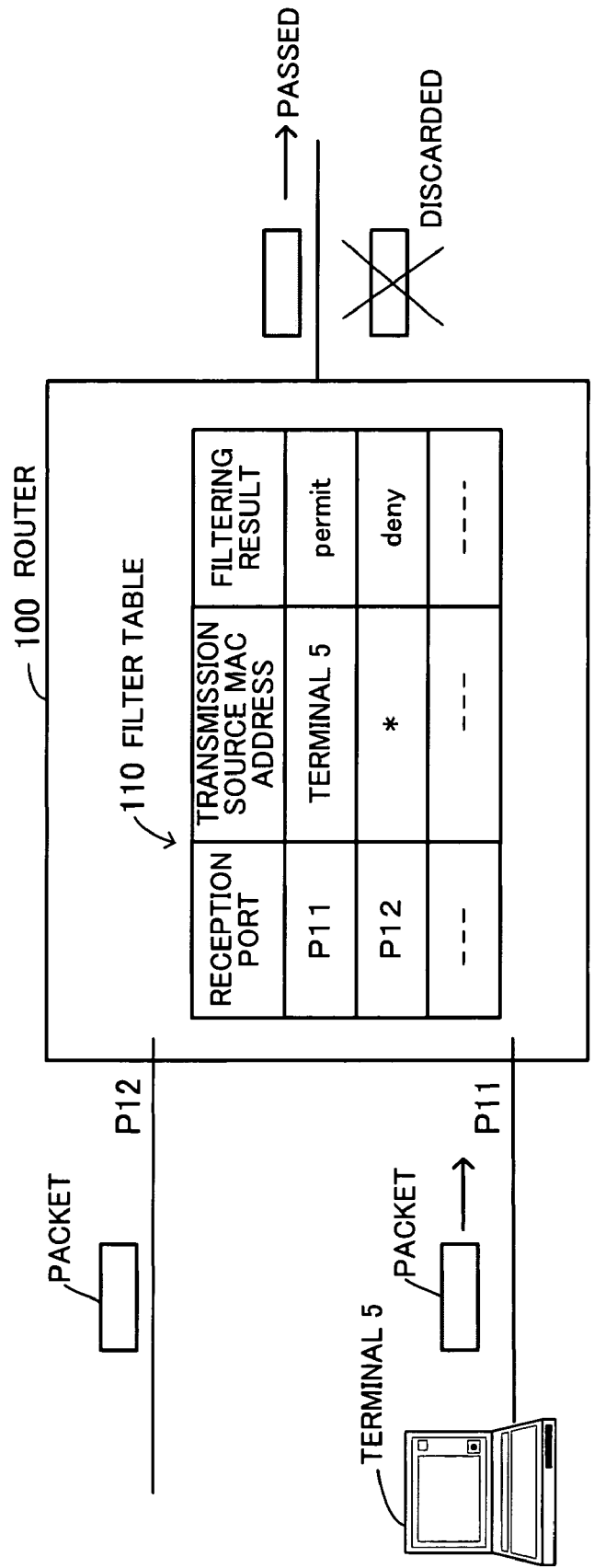
FIG. 22 is a view showing a router having a filter table.
Figure 23:
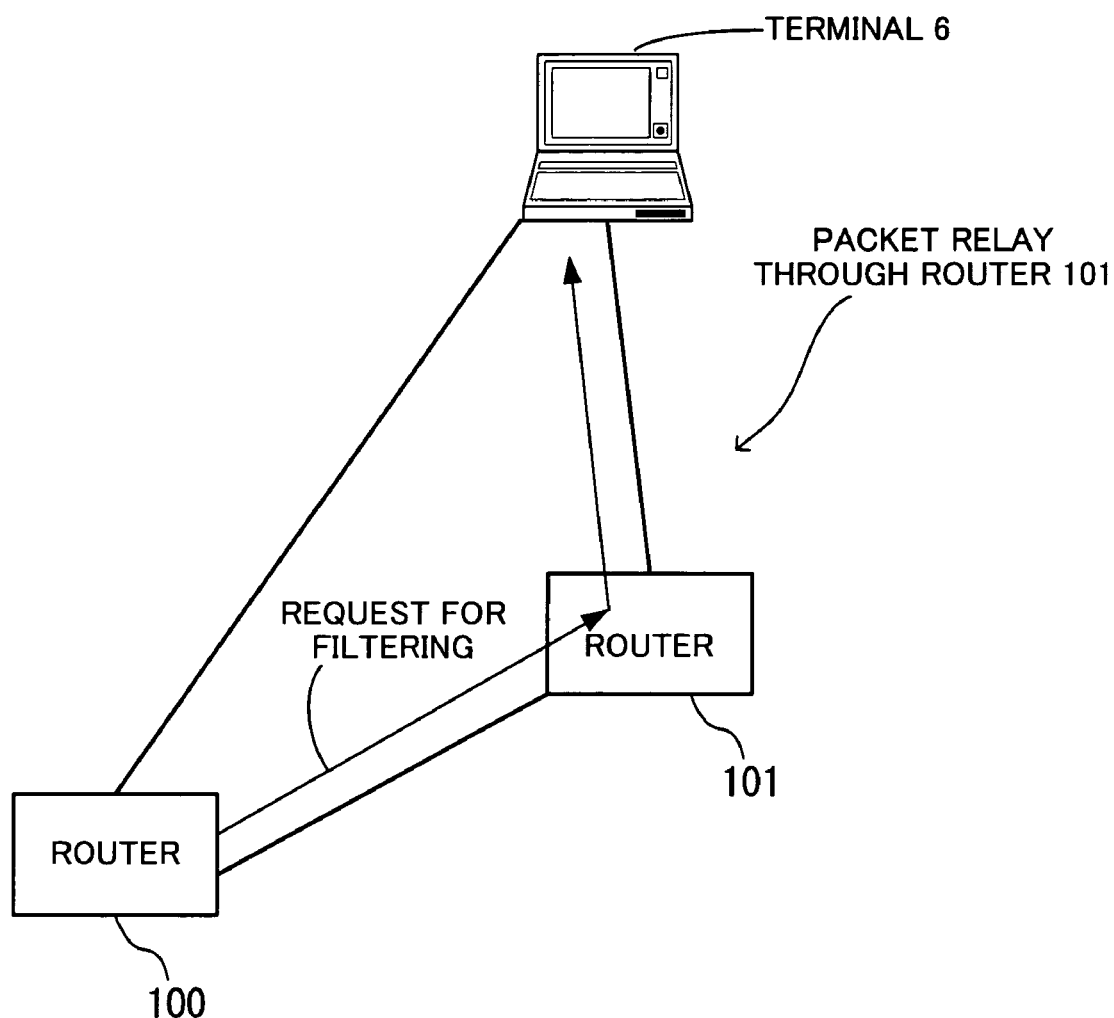
FIG. 23 is a view showing packet relaying where another router performs filtering by request.

FIG. 21 is a view showing packet formats having a special header. The original packet is encapsulated, and a special header, IP header, and MAC header are added. When a tunnel protocol of layer 3 or higher is used for a path established between the filtering request node and the proxy filtering node, the present invention can be applied even if another router exists between the filtering request node and the proxy filtering node. Accordingly, applicable network patterns can be increased. When a VLAN path is established between the filtering request node and the proxy filtering node, no routers or no other nodes should exist between the filtering request node and the proxy filtering node. In tunneling, a router or another node is allowed to exit there.

(2) The filtering request block 16a may generate a filtering request packet, inserting log information including at least the packet reception time as well as the request path identifier. The filtering return block 18b may generate a proxy filtering packet, inserting log information including at least the reception time of the filtering request packet as well as the return path identifier. FIG. 21 shows a special header format pattern 2, in which the time information is inserted. The inserted time information can be used for network management.

(3) The filtering return block 18b may generate a proxy filtering packet, inserting an entry number the proxy filtering block 17b obtains from the proxy filter table T7-2 as well as the return path identifier. If the packet is discarded in proxy filtering by a proxy packet relay apparatus, the network administrator can recognize the discarded filtering definition from the inserted entry number.

(4) When node R1 makes a filtering request to node R2 because of the shortage of entries according to the first to third embodiments, a series of software programs of the request source filter status determination block 14*a* and the table management block T of node R1 autonomously recognizes the shortage of entries, finds a node having an available entry and an unused path number (VLAN ID value), and sets up the table of the node. Manual set-up by the network administrator is also allowed.

In a packet relay system of the present invention, when a request source packet relay apparatus makes a request that a proxy apparatus performs proxy filtering of a received packet, a request path on which the packet, subjected to proxy filtering, is sent to the proxy apparatus and a return path on which the packet proxy-filtered by the proxy apparatus is received are established in advance; when proxy filtering is requested, a request path identifier is inserted in the packet sent to the proxy apparatus; when proxy filtering is necessary, a proxy packet relay apparatus searches through a proxy filter table by the request path identifier and determines whether the received packet can be relayed or not; when relaying is permitted, a return path identifier is inserted into the packet returned to the request source packet relay apparatus. Even if a filter table in the request source packet relay apparatus does not have an available space, the proxy packet relay apparatus performs filtering and returns the packet, and the request source packet relay apparatus relays the filtered packet, so that the quality of communication in packet relaying can be enhanced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A packet relay system for relaying packet communication, the packet relay system comprising:
   a request source packet relay apparatus comprising:
   a path establishment block which establishes a request path on which a received packet to be proxy-filtered is sent to a proxy apparatus requested to perform proxy filtering of the packet and a return path on which the packet proxy-filtered by the proxy apparatus is received;
   a request source filter status determination block which determines whether the received packet requires a request that another apparatus performs proxy filtering, does not require the request, or has already been proxy-filtered and, when the packet requires the request, obtains a request destination port used to send the packet to the proxy apparatus and a request path identifier;
   a filtering request block which inserts the request path identifier into the packet to generate a filtering request packet;
   a request source transmission block which sends the filtering request packet from the request destination port to the proxy apparatus; and
   a packet update block which receives a proxy filtering packet and, when the request source filter status determination block determines that the proxy filtering packet has already been proxy-filtered, deletes a return path identifier from the packet, updates header information, and relays the packet; and
   a proxy packet relay apparatus comprising:
   a proxy filter status determination block which receives the filtering request packet, which includes the request path identifier, determines whether the packet requires proxy filtering or not, and, when proxy filtering is required, obtains a proxy destination port used to send the packet to the request source packet relay apparatus and the return path identifier;
   a proxy filter table which specifies the conditions of filtering of the received packet;
   a proxy filtering block which determines whether the filtering request packet can be relayed or should be discarded by searching through the proxy filter table using the request path identifier as a key, when proxy filtering is performed;
   a filtering return block which generates the proxy filtering packet by deleting the request path identifier from the filtering request packet and inserting the return path identifier, when the packet can be relayed; and
   a proxy transmission block which performs loopback transmission of the proxy filtering packet from the proxy destination port to the request source packet relay apparatus.

2. The packet relay system according to claim 1, wherein the request source packet relay apparatus further comprises a port decode block which decodes the return path identifier to obtain the initial reception port number of the received packet before the filtering request is made, when the proxy filtering packet is received.

3. The packet relay system according to claim 1, wherein the path establishment block establishes a VLAN path or an IP tunnel path as the request path and the return path.

4. The packet relay system according to claim 1, wherein the filtering request block generates the filtering request packet by inserting log information including at least a packet reception time, as well as the request path identifier; and the filtering return block generates the proxy filtering packet by inserting log information including at least a reception time of the filtering request packet, as well as the return path identifier.

5. The packet relay system according to claim 1, wherein the filtering return block generates the proxy filtering packet by inserting an entry number found when the proxy filtering block searches through the proxy filter table, as well as the return path identifier, such that a network administrator can recognize a discarded filtering definition if a packet is discarded in proxy filtering by the proxy packet relay apparatus.

6. A packet relay apparatus for relaying packet communication, the packet relay apparatus comprising:
   a path establishment block which establishes a request path on which a received packet to be proxy-filtered is sent to a proxy apparatus requested to perform proxy filtering of the packet and a return path on which the packet proxy-filtered by the proxy apparatus is received;
   a request source filter status determination block which determines whether the received packet requires a request that another apparatus performs proxy filtering, does not require the request, or has already been proxy-filtered and, when the packet requires the request, obtains a request destination port used to send the packet to the proxy apparatus and a request path identifier;
   a filtering request block which inserts the request path identifier into the packet to generate a filtering request packet;
   a request source transmission block which sends the filtering request packet from the request destination port to the proxy apparatus;
   a proxy filter status determination block which receives the filtering request packet, which includes the request path identifier, determines whether the packet requires proxy filtering or not, and, when proxy filtering is required, obtains a proxy destination port used to send the packet to the request source packet relay apparatus and a return path identifier;

a proxy filter table which specifies the conditions of filtering of the received packet;

a proxy filtering block which determines whether the filtering request packet can be relayed or should be discarded by searching through the proxy filter table using the request path identifier as a key, when proxy filtering is performed;

a filtering return block which generates a proxy filtering packet by deleting the request path identifier from the filtering request packet and inserting the return path identifier, when the packet can be relayed;

a proxy transmission block which performs loopback transmission of the proxy filtering packet from the proxy destination port to the request source packet relay apparatus; and a packet update block which receives the proxy filtering packet and, when the request source filter status determination block determines that the proxy filtering packet has already been proxy-filtered, deletes the return path identifier from the packet, updates header information, and relays the packet.

7. The packet relay apparatus according to claim 6, further comprising a port decode block which decodes the return path identifier to obtain the initial reception port number of the received packet before the filtering request is made, when the proxy filtering packet is received.

8. The packet relay apparatus according to claim 6, wherein the path establishment block establishes a VLAN path or an IP tunnel path as the request path and the return path.

9. The packet relay apparatus according to claim 6, wherein the filtering request block generates the filtering request packet by inserting log information including at least a packet reception time, as well as the request path identifier; and the filtering return block generates the proxy filtering packet by inserting log information including at least a reception time of the filtering request packet, as well as the return path identifier.

10. The packet relay apparatus according to claim 6, wherein the filtering return block generates the proxy filtering packet by inserting an entry number found when the proxy filtering block searches through the proxy filter table, as well as the return path identifier, such that a network administrator can recognize a discarded filtering definition if a packet is discarded in proxy filtering.

* * * * *